United States Patent
Tanzi et al.

(10) Patent No.: US 9,722,713 B2
(45) Date of Patent: *Aug. 1, 2017

(54) ARCHITECTURE AND CONTROL OF ANALOG SELF-INTERFERENCE CANCELLATION

(71) Applicant: INTEL IP CORPORATION, Santa Clara, CA (US)

(72) Inventors: Nebil Tanzi, Hoffman Estates, IL (US); Gregory Chance, Oberhaching (DE)

(73) Assignee: Intel IP Corporation, Santa Clara, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 14/751,579

(22) Filed: Jun. 26, 2015

(65) Prior Publication Data

US 2016/0380706 A1   Dec. 29, 2016

(51) Int. Cl.

| | |
|---|---|
| H04B 1/44 | (2006.01) |
| H04B 15/00 | (2006.01) |
| H04B 1/12 | (2006.01) |
| H04B 1/525 | (2015.01) |
| H04B 1/48 | (2006.01) |
| H04B 7/06 | (2006.01) |

(52) U.S. Cl.
CPC ............ *H04B 15/00* (2013.01); *H04B 1/123* (2013.01); *H04B 1/48* (2013.01); *H04B 1/525* (2013.01); *H04B 7/061* (2013.01); *H04B 2001/485* (2013.01)

(58) Field of Classification Search
CPC ...... H04B 1/525; H04B 7/0413; H04B 15/00; H04B 1/123; H04B 1/48; H04B 1/56; H04B 1/38; H04B 1/44; H04L 5/14

USPC ........................................................... 455/78
See application file for complete search history.

(56) References Cited

U.S. PATENT DOCUMENTS

| | | |
|---|---|---|
| 2008/0198772 A1 | 8/2008 | Loh |
| 2008/0242245 A1 | 10/2008 | Aparin |
| 2009/0186582 A1 | 7/2009 | Muhammad et al. |

(Continued)

OTHER PUBLICATIONS

Notice of Allowance Dated Nov. 18, 2016 U.S. Appl. No. 14/976,647.

(Continued)

*Primary Examiner* — Eugene Yun
(74) *Attorney, Agent, or Firm* — Eschweiler & Potashnik, LLC

(57) ABSTRACT

An apparatus for interference cancellation in wireless communication systems configured for reception, comprises a receive signal path configured to convey an overall receive (Rx) signal comprising an Rx signal and a residual transmit (Tx) signal, from an antenna port to an Rx input port of a transceiver, and at least one cancellation path configured to receive a leakage Tx signal from the antenna port. Further, the apparatus comprises a cancellation unit configured to apply a cancellation signal to the overall Rx signal in the receive signal path and a compensation unit configured to generate the cancellation signal by modifying the leakage Tx signal in the cancellation path, based on a compensation control signal. In addition, the apparatus comprises a feedback receiver unit configured to generate the compensation control signal based on the residual Tx signal in the overall Rx signal and the cancellation signal.

27 Claims, 11 Drawing Sheets

(56) References Cited

U.S. PATENT DOCUMENTS

| | | |
|---|---|---|
| 2009/0213770 A1 | 8/2009 | Mu |
| 2013/0201880 A1 | 8/2013 | Bauder et al. |
| 2013/0321097 A1 | 12/2013 | Khlat et al. |
| 2014/0194073 A1 | 7/2014 | Wyville et al. |
| 2014/0198688 A1* | 7/2014 | Li .......................... H04B 1/525 370/278 |
| 2015/0146583 A1 | 5/2015 | Yoon et al. |
| 2015/0146589 A1 | 5/2015 | Webb et al. |
| 2015/0171903 A1 | 6/2015 | Mehlman et al. |
| 2015/0215937 A1 | 7/2015 | Khandani |
| 2015/0236842 A1 | 8/2015 | Goel et al. |

OTHER PUBLICATIONS

European Search Report dated Nov. 9, 2016 in connection with European Patent Application No. 16171188.2-1874.
"Power Dividers and Directional Couplers." pp. 6-4.1-6-4.5. Dec. 16, 1998.
"White Paper: Interference in Cellular Networks." JDSU, 12 pages. Sep. 2013.
U.S. Appl. No. 14/976,647, filed Dec. 21, 2015.
Non Final Office Action Dated May 31, 2016 U.S. Appl. No. 14/976,647.
Extended European Search Report dated May 8, 2017 for European Application No. 16198433.1-1874.

* cited by examiner

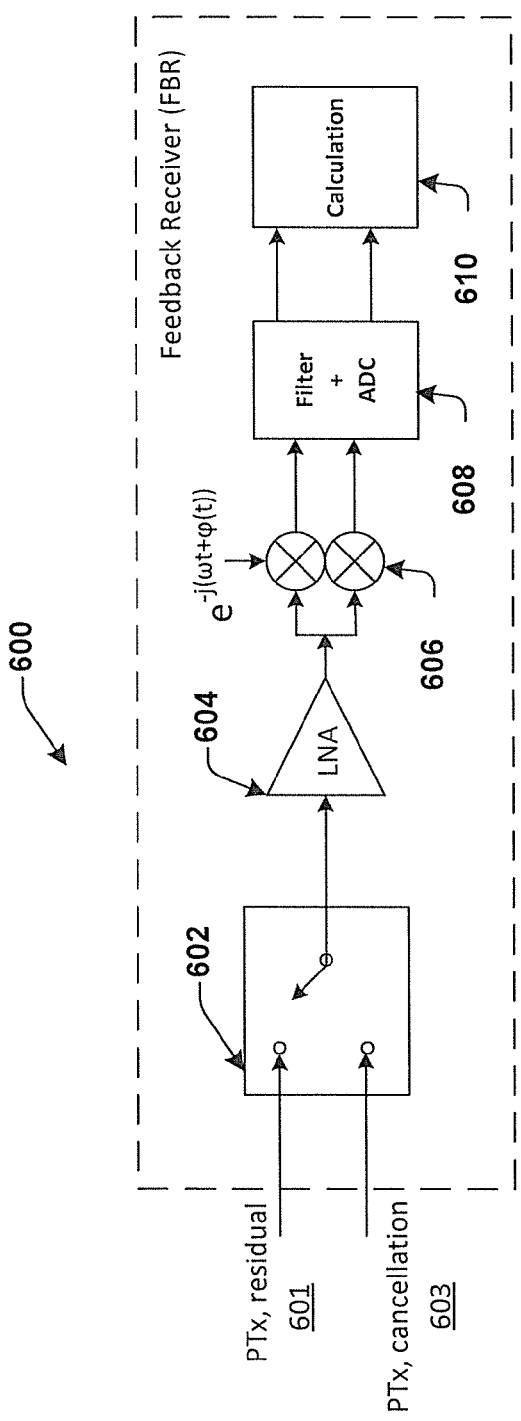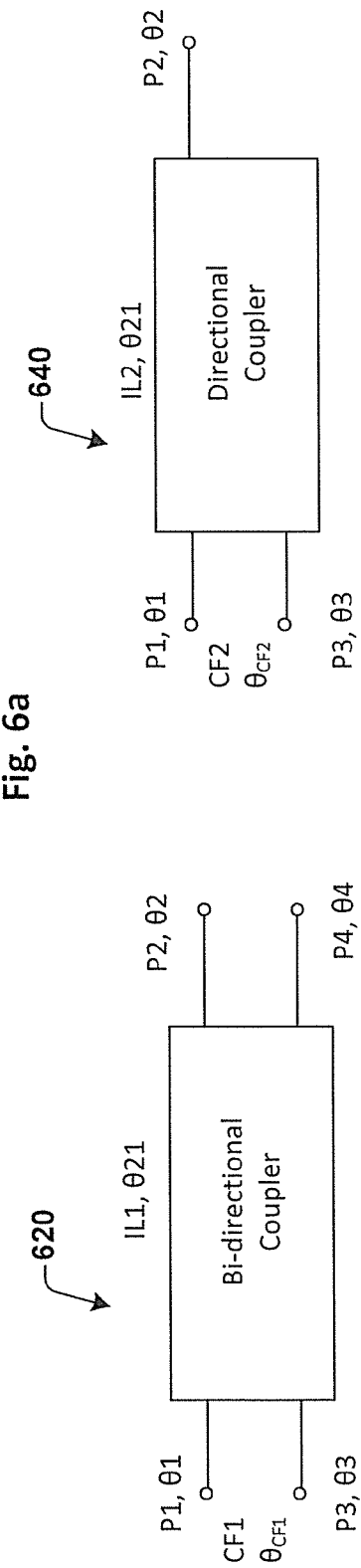

ARCHITECTURE AND CONTROL OF ANALOG SELF-INTERFERENCE CANCELLATION

FIELD

The present disclosure relates to wireless communication systems and, in particular to an apparatus for interference cancellation in wireless communication systems.

BACKGROUND

Interference in cellular networks is one of the most common problems in radio access networks. In frequency division duplex (FDD) cellular systems, both the receiver and transmitter are active at the same time. As a result, a transmit (Tx) signal from the transmitter leaks into the receiver causing interference in a receive (Rx) signal from an antenna. The interference can result in dropped calls, decreased receiver sensitivity (and range), increased Rx noise figure and desensitization of receive-system active components.

To prevent the Tx signal from leaking into the transmitter, in some topologies, high-performance filters are used in the front end. However, the high-performance filters at the front end incur significant cost for an original equipment manufacturer (OEM). To reduce the cost, it has been proposed that expensive filters be replaced by using low cost filters and their performance augmented by using self-interference cancellation. Proposals for using self-interference cancellation, have so far been approached by using predetermined cancellation parameters (such as amplitude and phase shift) to cancel out the interference in the Rx signal. However, with changes in environment conditions, there will be variations in the interference in the Rx signal and these topologies do not address the issue of maintaining the cancellation with the changes in the environment conditions. In particular, temperature changes and proximity of antennas to a hand, head, or other objects can cause large variation in voltage standing wave ratio (VSWR) at the antenna resulting in amplitude or phase changes in the interfering signal to be cancelled.

BRIEF DESCRIPTION OF THE DRAWINGS

Some examples of circuits, apparatuses and/or methods will be described in the following by way of example only. In this context, reference will be made to the accompanying Figures.

FIG. 6a shows an example implementation of a feedback receiver unit 600, according to one embodiment of the disclosure.

FIG. 6b shows an example implementation of a bi-directional coupler 620, according to one embodiment of the disclosure.

FIG. 6c shows an example implementation of a directional coupler 640, according to one embodiment of the disclosure.

DETAILED DESCRIPTION

Figure 1:
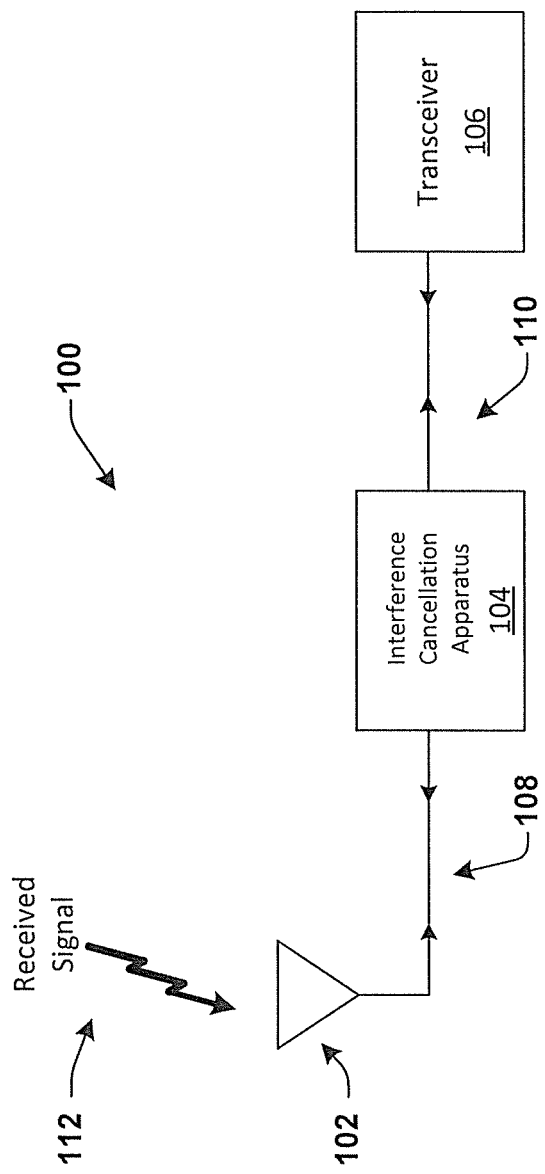
FIG. 1 shows a simplified block diagram of an example front-end system 100 of a cellular system comprising an interference cancellation apparatus.

In one embodiment of the disclosure, an apparatus for interference cancellation in a wireless communication system configured for reception, comprises a receive signal path configured to convey an overall receive (Rx) signal comprising an Rx signal and a residual transmit (Tx) signal, from an antenna port to an Rx input port of a transceiver and at least one cancellation path configured to receive a leakage Tx signal from the antenna port. The apparatus further comprises a cancellation unit configured to apply a cancellation signal to the overall Rx signal in the receive signal path and a compensation unit configured to generate the cancellation signal by modifying the leakage Tx signal in the cancellation path, based on a compensation signal. In addition, the apparatus comprises a feedback receiver unit configured to generate the compensation control signal based on measurement and calculations of the residual Tx signal in the overall Rx signal and the cancellation signal.

In another embodiment of the disclosure, an apparatus for interference cancellation in a wireless communication system configured for reception on a diversity antenna comprises a receive signal path configured to convey an overall receive (Rx) signal comprising an Rx signal and a residual transmit (Tx) signal, from a diversity antenna port to an Rx input port of a transceiver and at least one cancellation path configured to receive a leakage Tx signal from the diversity antenna port. The apparatus further comprises a first coupling unit configured to sample the leakage Tx signal in the cancellation path, and generate a first leakage Tx output signal at a first output thereof and a second leakage Tx output signal at a second output thereof. Furthermore, the apparatus comprises a second coupling unit configured to receive the overall Rx signal and sample the residual Tx signal from the overall Rx signal to generate a residual Tx output signal at a first output thereof, and receive the first leakage Tx output signal from the first output of the first coupling unit and cancel the residual Tx signal in the overall Rx signal at a second output thereof. In addition, the apparatus comprises a feedback receiver unit configured to receive the residual Tx output signal from the first output of the second coupling unit and the second leakage Tx output signal from the second output of the first coupling unit, and generate a compensation control signal to provide the appropriate settings for compensating the leakage Tx signal in the cancellation path based on the residual Tx output signal and the second leakage Tx output signal.

In another embodiment of the disclosure, an apparatus for interference cancellation in a wireless communication system, comprises at least one receive signal path configured to convey an overall receive (Rx) signal comprising an Rx signal and a residual transmit (Tx) signal from an antenna port to an Rx input port of a transceiver and at least one transmit signal path configured to convey an overall Tx signal comprising a Tx signal at a Tx frequency and a Tx signal at a Rx frequency, from a Tx output port of the transceiver to the antenna port. The apparatus further comprises a cancellation unit configured to apply a first cancellation signal and a second cancellation signal to the overall Rx signal in the receive signal path. Furthermore, the apparatus comprises a first compensation unit configured to generate the first cancellation signal by modifying the Tx signal at the Rx frequency in the overall Tx signal in the transmit signal path, based on a first compensation signal and a second compensation unit configured to generate the second cancellation signal by modifying the Tx signal at the Tx frequency in the overall Tx signal in the transmit signal path, based on a second compensation signal. In addition, the apparatus comprises a feedback receiver unit configured to generate the first compensation control signal based on the residual Tx signal in the overall Rx signal and the first cancellation signal, and configured to generate the second compensation control signal based on the residual Tx signal in the overall Rx signal and the second cancellation signal.

In another embodiment of the disclosure, an apparatus for interference cancellation in a wireless communication system for a main antenna, comprises a receive signal path configured to convey an overall receive (Rx) signal comprising an Rx signal and a residual transmit (Tx) signal from a main antenna port to an Rx input port of a transceiver and a transmit signal path configured to convey an overall Tx signal comprising a Tx signal at a Tx frequency and a Tx signal at a Rx frequency, from a Tx output port of the transceiver to the main antenna port. The apparatus further comprises a first coupling unit configured to sample the overall Tx signal in the transmit signal path and generate a first overall Tx signal at a first output thereof and a second overall Tx signal at a second output thereof, a second coupling unit configured to sample the Tx signal at Rx frequency in the first overall Tx signal and generate a first coupled signal at a first output thereof and a second coupled signal at a second output thereof and a third coupling unit configured to receive the overall Rx signal and sample the residual Tx signal in the overall Rx signal to generate a residual Tx output signal at a first output thereof, and configured to receive the first coupled signal from the first output of the second coupling unit and provide a cancellation of the Tx signal at Rx frequency in the overall Rx signal at a second output thereof. Furthermore, the apparatus comprises a fourth coupling unit configured to sample the Tx signal at the Tx frequency in the second overall Tx signal and generate a third coupled signal at a first output thereof and a fourth coupled signal at a second output thereof, and configured to provide the third coupled signal to the second output of the third coupling unit and provide a cancellation of the Tx signal at Tx frequency in the overall Rx signal at the second output of the third coupling unit. In addition, the apparatus comprises a feedback receiver unit configured to receive the residual Tx output signal from the first output of the third coupling unit, the second coupled signal from the second output of the second coupling unit and the fourth coupled signal from the second output of the fourth coupling unit, and generate a first compensation control signal to provide the appropriate settings for compensating the Tx signal at the Rx frequency in the first overall Tx signal and a second compensation control signal to provide the appropriate settings for compensating the Tx signal at the Tx frequency in the second overall Tx signal.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "unit," "element," and the like are intended to refer to an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a unit can be an apparatus that provides specific functionality through electronic components without mechanical parts; the electronic components can include one or more processors therein to execute software and/or firmware that confer(s), at least in part, the functionality of the electronic components.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Use of the word exemplary is intended to present concepts in a concrete fashion. As used in this application, the term "sample" or "sampling" or "sampled" is intended to mean "isolating a signal" or "coupling a signal" rather than the conventional usage which means "reduction of a continuous signal to a discrete signal". The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure.

In addition, features of the different embodiments described hereinafter may be combined with each other, unless specifically noted otherwise.

As indicated above, interference in cellular networks is one of the most common problems in the radio access network. The effects of interference range from being a minor annoyance to making the wireless system completely unusable. Different systems and services such as mobile communications, mobile radios, paging, wireless local area networks, and digital video broadcasting each use an assigned spectrum to avoid transmitting different services at the same frequency, causing signal collisions or interference. However, even if different wireless services don't generate harmonics, frequency drifts, or RF leakage, cell sites and user equipment (UE) are subject to internal interference caused by the improper conductivity of passive devices such as connectors, cables, or antennas.

This disclosure is directed towards an apparatus for self-interference cancellation in a cellular device and a method for implementing the self-interference cancellation. In frequency division duplex (FDD) cellular systems, both the receiver and transmitter are active at the same time. As a result, a transmit (Tx) signal from the transmitter leaks into the receiver causing interference in a receive (Rx) signal. In order to prevent the transmitter from leaking into the receiver, filters are used in the front end of the cellular systems. Typically, in conventional systems, expensive, high-performance filters implemented in surface acoustic wave (SAW) or bulk acoustic wave (BAW) technologies are used. These filters may prevent the Tx signals from leaking into the Rx signals, however, these high-performance filters at the front end incur significant cost for an original equipment manufacturer (OEM). Active components or devices such as amplifiers are also required in wireless systems, and active components are prone to generating noise. In addition, the active components consume battery power and have a negative impact on the overall battery life of the system. The filters can compensate for the noise generated by the active components, but they also add insertion loss which results in additional battery power consumption. To provide a low cost and more energy efficient alternative, it has been proposed that the expensive filters are replaced by lower cost and lower insertion loss filters and their performance augmented by using self-interference cancellation. In such topologies, the primary principle is to sample the Tx signal though a frequency selective network such as a filter and adjust the amplitude and phase of the Tx signal in such a manner that when combined with the Tx signal leaking into the receiver, there would be a reduction/cancellation of the Tx signal at the receiver input. While these solutions may be interesting for enabling low-cost filters, a big problem for realization is that they do not address how to maintain the cancellation as the environment changes (for example, with VSWR or temperature changes). A closed loop control of the cancellation is thus required to overcome this issue. Therefore, an apparatus for calibrating the interference cancellation and enabling a closed loop control of the cancellation is introduced in the present disclosure. In some embodiments of the disclosure, the calibration methodology is realized using a feedback receiver that determines the amount of correction that needs to be applied to the amplitude and phase of the Tx signal.

In the following description, examples will be described and explained in more detail with respect to the interference cancellation in the Rx signal path of front-end systems in cellular networks. In particular, in one embodiment, an apparatus for self-interference cancellation in the receive (Rx) diversity path for a diversity antenna configured for reception alone is described and in another embodiment, an apparatus for self-interference cancellation in the main Rx path for a main antenna configured for both transmission and reception is described.

FIG. 1 depicts an example front-end system 100, for example, of a cellular system comprising an antenna 102, a transceiver 106 and an apparatus for interference cancellation 104 between the antenna 102 and the transceiver 106. The antenna 102 is configured to transmit and receive signals to and from the transceiver 106 via the apparatus 104. Further, the system 100 comprises a first signal path 108 configured to convey signals between the antenna 102 and the apparatus 104, and a second signal path 110 configured to convey signals between the apparatus 104 and the transceiver 106.

In one embodiment, the antenna 102 can comprise a diversity antenna configured for reception alone. Diversity is the practice of using two different antennas i.e., a main antenna and a diversity antenna in a cellular system to capture the best or combine cellular wireless signals. The diversity antenna operates to transfer a signal received at the antenna 102 to the transceiver 106 via the apparatus 104. Due to the close proximity of the main antenna to the diversity antenna in wireless communication systems, in some instances, a Tx leakage signal from the main antenna leaks into the received signal at the diversity antenna. Therefore, in some instances, the received signal 112 of FIG. 1 can comprise an Rx signal and a Tx leakage signal from the main antenna thereby causing interference in the received signal 112. In another embodiment of the disclosure, the antenna 102 can comprise a main antenna configured for both transmission and reception. The Tx signal at the main antenna can leak into a received signal at the main antenna. Therefore, in such instances, the received signal 112 in FIG. 1 can comprise an Rx signal and a Tx leakage signal from the main antenna thereby causing interference in the received signal 112.

The apparatus 104 is located downstream of the antenna 102 and operates to reduce or cancel the interference in the received signal 112. In one embodiment of the disclosure, wherein the antenna 102 comprises a diversity antenna, the apparatus 104 can comprise a receive signal path (not shown) configured to receive an overall Rx signal comprising the Rx signal and a residual Tx signal from the diversity antenna, and a cancellation path (not shown) configured to receive the Tx leakage signal from the diversity antenna. The residual Tx signal can be a portion of the Tx leakage signal. The apparatus 104 can also comprise an Rx filter in the receive signal path that operates to sample the overall Rx signal from the received signal 112 and a Tx filter in the cancellation path that operates to sample the Tx leakage signal from the received signal 112. Further, the apparatus 104 can comprise a cancellation unit configured to apply a cancellation signal to the overall Rx signal in the receive signal path and a compensation unit configured to generate the cancellation signal by modifying the Tx leakage signal in the cancellation path, based on a compensation signal. The cancellation unit further operates to sample the residual Tx signal from the overall Rx signal in the receive signal path.

Additionally, the apparatus 104 can comprise a feedback receiver unit configured to generate the compensation control signal based on the residual Tx signal in the overall Rx signal and the cancellation signal. The cancellation signal, for example, can be generated by adjusting the amplitude and phase of the Tx leakage signal in the cancellation path, such that when the cancellation signal is applied to the overall Rx signal in the receive signal path, the residual Tx signal can be cancelled from the overall Rx signal. The amplitude and phase parameters to be applied to the Tx leakage signal can be determined, for example, based on a comparison between the residual Tx signal in the overall Rx signal and the cancellation signal at the feedback receiver unit.

In another embodiment of the disclosure, wherein the antenna 102 comprises a main antenna, the apparatus 104 can comprise a receive signal path (not shown) configured to convey an overall Rx signal comprising the Rx signal and a residual Tx signal from the main antenna 102 to the transceiver 106, and a transmit signal path (not shown) configured to convey a Tx signal from the transceiver 106 to the antenna 102. The Tx signal in the transmit signal path can comprise a Tx signal at Rx frequency and a Tx signal at Tx frequency. The apparatus 104 can also comprise an Rx filter in the receive signal path that operates to sample the overall Rx signal from the received signal 112 and a Tx filter in the transmit signal path that filters the Tx signal in the transmit signal path to convey it to the main antenna 102. Further, the apparatus can comprise a cancellation unit configured to apply a cancellation signal to the overall Rx signal in the receive signal path and a compensation unit configured to generate the cancellation signal by modifying the Tx signal in the transmit signal path, based on a compensation signal. The cancellation unit further operates to sample the residual Tx signal from the overall Rx signal in the receive signal path.

Additionally, the apparatus 104 can comprise a feedback receiver unit configured to generate the compensation control signal based on the residual Tx signal in the overall Rx signal and the cancellation signal. In some implementations, the cancellation signal, for example, can comprise a first cancellation signal generated by adjusting the amplitude and phase of the Tx signal at Rx frequency in the Tx signal in the transmit signal path, and a second cancellation signal generated by adjusting the amplitude and phase of the Tx signal at Tx frequency in the Tx signal in the transmit signal path. The compensation unit, for example, can also comprise a first compensation unit configured to generate the first cancellation signal and a second compensation unit configured to generate the second cancellation signal.

The first signal path 108, for example, in the front-end of wireless communication systems with a diversity antenna, can comprise a first branch configured to convey the received signal 112 from the diversity antenna 102 to an input of the Rx filter in the receive signal path of the apparatus 104 and a second branch configured to convey the received signal 112 from the diversity antenna 102 to an input of the Tx filter in the cancellation path of the apparatus 104. In wireless communication systems with a main antenna, the first signal path 108 can comprise a first branch configured to convey the received signal 112 from the main antenna 102 to an input of the Rx filter in the receive signal path of the apparatus 104 and a second branch configured to convey the Tx signal from the output of the Tx filter to the main antenna 102.

The second signal path 110, for example, in the front-end of wireless communication systems with a diversity antenna can comprise a signal path coupled to the receive signal path of the apparatus 104 and configured to convey a Rx signal with reduced interference from an output of the apparatus 104 to an Rx input port of the transceiver 106. In wireless communication systems with a main antenna, the second signal path 110 can comprise a first branch coupled to the receive signal path of the apparatus 104 and configured to convey a Rx signal with reduced interference from an output of the apparatus 104 to an Rx input port of the transceiver 106 and a second branch coupled to the transmit signal path of the apparatus 104 and configured to convey a Tx signal from a Tx output port of the transceiver 106 to an input of the apparatus 104.

Figure 2:
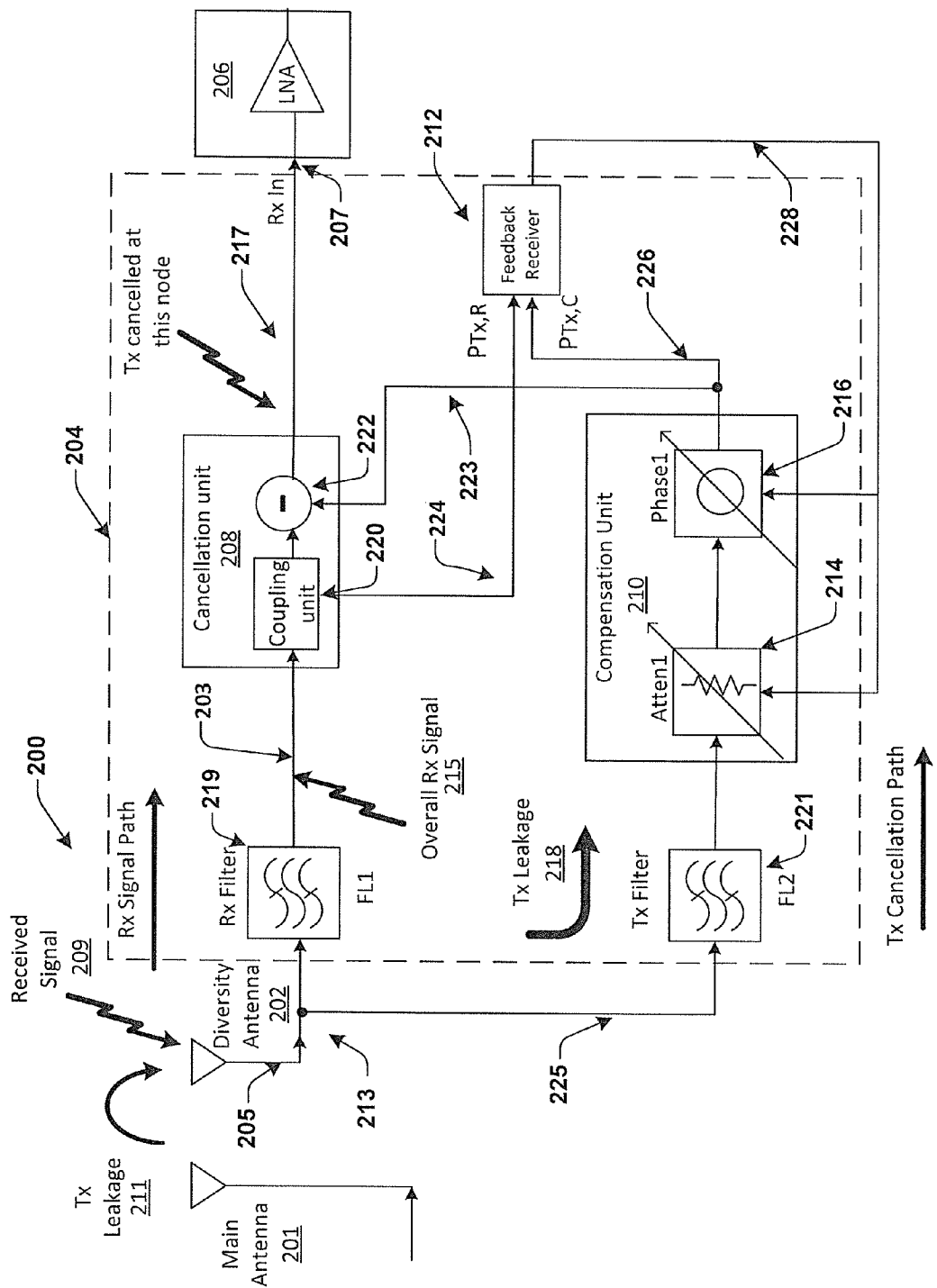
FIG. 2 shows a wireless communication system 200 comprising an interference cancellation apparatus for a diversity antenna, according to one embodiment of the disclosure.

FIG. 2 depicts a particular embodiment of interference cancellation in a wireless communication system 200 comprising a diversity antenna 202, a transceiver 206 and an apparatus for interference cancellation 204 between the antenna 202 and the transceiver 206. The antenna 202 is configured to receive a received signal 209 to be conveyed to an Rx input port 207 of the transceiver 206 via the apparatus 204. Due to the close proximity of a main antenna 201 to the diversity antenna 202, the received signal 205 at the antenna port 213 comprises the received signal 209 and a Tx leakage signal 211 from the main antenna 201 causing interference.

The apparatus 204 is configured to reduce/cancel the interference in the received signal at the antenna port 213. The apparatus 204 is located downstream of the diversity antenna 202 and is configured to receive the Rx signal 205 including the received signal 209 and a Tx leakage signal 211 from the diversity antenna port 213 and convey primarily the Rx signal 209 to the Rx input port 207 of the transceiver 206. In one embodiment, the apparatus 204 comprises a receive signal path 203 configured to receive an overall Rx signal 215 sampled via an Rx filter 219 from the received signal 209 at the diversity antenna port 213. The overall Rx signal 215 comprises the Rx signal 209 and a residual Tx signal. The residual Tx signal comprises a portion of the Tx leakage signal 211 coupled to the Rx signal 209 at the diversity antenna port 213. The apparatus 204 further comprises a cancellation path 225 configured to receive a Tx leakage signal 218 sampled via a Tx filter 221 from the received signal 205 at the diversity antenna port 213. The Tx filter operates to remove a significant portion of the Rx signal 209. The Tx leakage signal 218 comprises the Tx leakage signal 211 coupled to the Rx signal 209 at the diversity antenna port 213. While the cancellation path 225 in FIG. 2 has just one branch, other implementations of the cancellation path 225 can have a plurality of branches.

Additionally, the apparatus 204 comprises a cancellation unit 208 in the Rx signal path that is configured to apply a cancellation signal 223 to the overall Rx signal 215 in the receive signal path 203, a compensation unit 210 configured to generate the cancellation signal 223 by modifying the Tx leakage signal 218 in the cancellation path based on a compensation control signal 228, and a feedback receiver unit 212 configured to generate the compensation control signal 228 based on the residual output Tx signal, PTx,R 224 and a cancellation signal, PTx,C 223. In some embodiments, the cancellation signal 223 and the cancellation signal 226 are the same. The cancellation unit 208 is further configured to sample the residual Tx signal from the overall Rx signal 215 via a coupling unit or like component and provide the residual output Tx signal PTx,R 224 to an input of the feedback receiver unit 212.

The cancellation unit 208 is located downstream of the Rx filter 219 in the receive signal path 203 and is configured to receive the overall Rx signal 215 at a first input of the cancellation unit 208 and receive the cancellation signal 223 at a second input of the cancellation unit 208. The cancellation unit 208 of FIG. 2 further comprises a coupling unit 220 configured to sample the residual Tx signal from the overall Rx signal 215 and provide a residual output Tx signal 224 at a first output of the cancellation unit 208 and a subtractor unit 222 configured to subtract the cancellation signal 223 from the overall Rx signal 215 and provide a cancellation of the residual Tx signal from the overall Rx signal 215, thereby generating a Rx signal with reduced interference 217 at a second output of the cancellation unit 208. Alternatively, the cancellation unit 208 can comprise a combiner unit configured to combine the cancellation signal 223 with the overall Rx signal 215, wherein the cancellation signal 223 is 180 degree out of phase with the residual output Tx signal 224, thereby resulting in the subtraction of the cancellation signal 223 from the overall Rx signal 215.

In one embodiment, the cancellation unit 208 is implemented by using a bi-directional coupler having 2 inputs and 2 outputs. The bi-directional coupler implements both the coupling unit 220 and the subtractor unit 222, and operates to provide the sampling of the residual Tx signal from the overall Rx signal 215 and the subtraction of the cancellation signal 223 from the overall Rx signal 115 concurrently. However, in other embodiments, the coupling unit 220 and the subtractor unit 222 can be implemented by 2 different circuit elements.

The compensation unit 210 is located downstream of the Tx filter 221 in the cancellation path 225 and is configured to receive the Tx leakage signal 218 at an input of the compensation unit 210. In some implementations, the Tx filter 221 and the compensation unit 210 are implemented as discrete components, however, in other embodiments, the Tx filter 221 and the compensation unit 210 may be integrated together. The compensation unit 210 further comprises an attenuation unit 214 and a phase shift unit 216 and is configured to modify the Tx leakage signal 218 by providing an attenuation or phase shift, or both, to the Tx leakage signal 218, thereby generating the cancellation signal 223/226 at an output of the compensation unit 210. The attenuation and/or phase shift to be applied to the Tx leakage signal 218 is provided by the compensation control signal 228 from the feedback receiver unit 212. In some implementations, both attenuation and phase shift are applied to the Tx leakage signal 218 at the same time, however, in other implementations, either attenuation alone or phase shift alone can be applied at one time. In implementations wherein the cancellation path 225 comprises a plurality of branches, a compensation unit is associated with each of the plurality of branches. For instance, when cancellation path consists of one branch, the residual Tx signal can be cancelled out completely at one frequency. Similarly, when cancellation path consists of two branches, the residual Tx signal can be cancelled out completely at two frequencies, and so on.

The feedback receiver 212 of FIG. 2 comprises a first input configured to receive the residual output Tx signal PTx,R 224 from the cancellation unit 208 and a second input configured to receive the cancellation signal PTx,C 226 from the compensation unit 210 and is configured to generate the compensation control signal 228 at an output of the feedback receiver unit 212. In some embodiments, the feedback receiver 212 may be separate from the transceiver 206 as illustrated, however, in other embodiments, the feedback receiver 212 may be a part of the transceiver 206. The compensation control signal 228 is generated based on a comparison between the residual output Tx signal PTx,R 224 and the cancellation signal PTx,C 226. In some implementations, the Tx leakage signal 211 is compared with a Tx power threshold, PTx,th and the compensation circuitry including the feedback receiver 212 and the compensation unit 210 is disabled when the power of the Tx leakage signal 211 is below the Tx power threshold, PTx,th. The compensation control signal 228 provides the appropriate attenuation or phase shift, or both to the Tx leakage signal 218 in the cancellation path 225, thereby providing a closed loop control of the interference cancellation.

Figure 3:
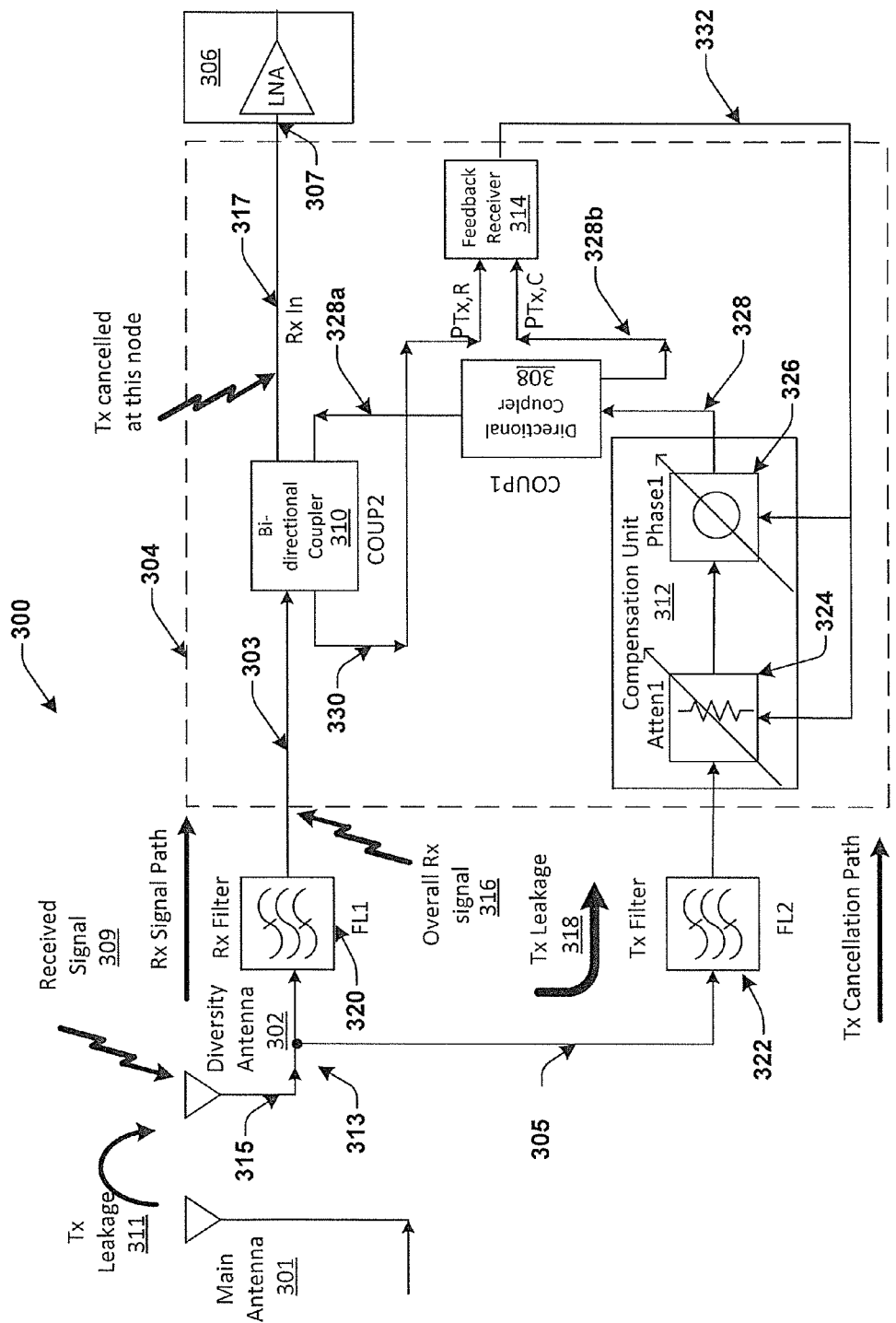
FIG. 3 shows an example implementation of a wireless communication system 300 comprising an interference cancellation apparatus for a diversity antenna, according to another embodiment of the disclosure.

FIG. 3 depicts an example implementation of interference cancellation in a wireless communication system 300 with a diversity antenna according to one embodiment of the disclosure. The wireless communication system 300 comprises a diversity antenna 302, a transceiver 306 and an apparatus for interference cancellation 304 between the diversity antenna 302 and the transceiver 306. The antenna 302 is configured receive a received signal 309 to be conveyed to an Rx input port 307 of the transceiver 306 via the apparatus 304. Due to the close proximity of a main antenna 301 to the diversity antenna 302, a received signal 315 at the antenna port 313 comprises the received signal 309 and a Tx leakage signal 311 from the main antenna 301 causing interference.

The apparatus 304 is configured to reduce/cancel the interference in the received signal 315 at the antenna port 313. The apparatus 304 is located downstream of the diversity antenna 302 and is configured to receive the received signal 315 from the diversity antenna port 313 and convey the received signal 315 to the Rx input port 307 of the transceiver 306. The apparatus 304 comprises a receive signal path 303 configured to receive an overall Rx signal 316 sampled via an Rx filter 320 from the received signal 315 at the diversity antenna port 313. The overall Rx signal 316 comprises the Rx signal 309 and a residual Tx signal. The residual Rx signal can be a portion of the Tx leakage signal 311 coupled to the Rx signal 309 at the diversity antenna port 313. The apparatus 304 further comprises a cancellation path 305 configured to receive a Tx leakage signal 318 sampled via a Tx filter 322 from the received signal 315 at the diversity antenna port 313. The Tx leakage signal 318 comprises the Tx leakage signal 311 in the Rx signal 315 at the diversity antenna port 313.

Additionally, the apparatus 304 comprises a first coupling unit 308, a second coupling unit 310, a compensation unit 312 and a feedback receiver unit 314. The first coupling unit 308 comprises a directional coupler having an input and two outputs and is configured to sample a leakage Tx signal 328 at an output of the compensation unit 312 and generate a first leakage Tx output signal 328a at a first output thereof and a second leakage Tx output signal 328b at a second output thereof. In some embodiments, the leakage Tx signal 328 and the first leakage Tx output signal 328a are the same. The second coupling unit 310 comprises a bi-directional coupler having four ports and is located downstream of the Rx filter 320 in the receive signal path 303. The second coupling unit 310 is configured to receive the overall Rx signal 316 at a first input and sample the residual Tx signal from the overall Rx signal 316 to generate a residual Tx output signal PTx,R 330 at a first output thereof. Further, the second coupling unit 310 is configured to receive the first leakage Tx output signal 328a at a second input and cancel the first leakage Tx output signal 328a from the overall Rx signal 316, thereby providing a cancellation of the residual Tx signal from the overall Rx signal 316 to generate a Rx signal with reduced interference 317 at a second output thereof.

The compensation unit 312 is located downstream of the Tx filter 322 in the cancellation path 305 and is configured to receive the Tx leakage signal 318 at an input of the compensation unit 312. The compensation unit 312 further comprises an attenuation unit 324 and a phase shift unit 326 and is configured to modify the Tx leakage signal 318 by providing an attenuation or phase shift, or both, to the Tx leakage signal 318, thereby generating the Tx leakage signal 328 at an output of the compensation unit 312. The attenuation and phase shift to be applied to the Tx leakage signal 318 is provided by the compensation control signal 332 from the feedback receiver unit 314. In some implementations, the Tx leakage signal 318 and the Tx leakage signal 328 are different, however, in other implementations, the Tx leakage signal 318 and the Tx leakage signal 328 can be the same.

The feedback receiver 314 of FIG. 3 comprises a first input configured to receive the residual Tx output signal PTx,R 330 from the second coupling unit 310 and a second input configured to receive the second leakage Tx output signal PTx,C 328b from the first coupling unit 308, and is configured to generate the compensation control signal 332 at an output of the feedback receiver unit 314. The compensation control signal 332 is generated based on a comparison between the residual Tx output signal PTx,R 330 and the second leakage Tx output signal PTx,C 328b. In some implementations, the Tx leakage signal 311 is compared with a Tx power threshold, PTx,th and the compensation circuitry including the feedback receiver 314 and the compensation unit 312 are disabled when a power of the Tx leakage signal 311 is lower than the Tx power threshold, PTx,th. The feedback receiver 314 operates to provide the compensation control signal 332 to the compensation unit 312, thereby providing a closed loop control of the interference cancellation. Further implementation details of the feedback receiver unit 314 are provided in a subsequent figure.

Figure 4:
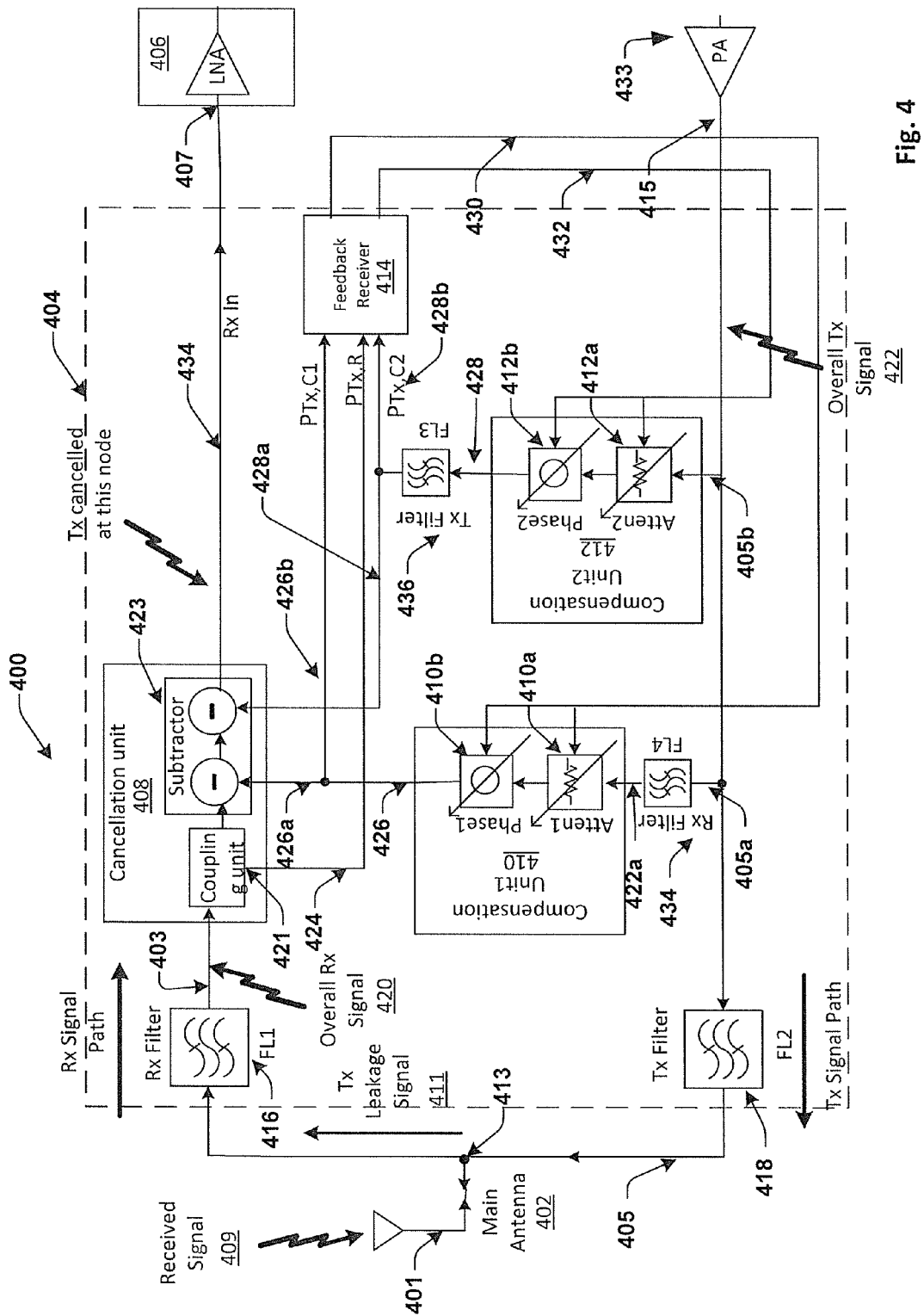
FIG. 4 shows a wireless communication system 400 comprising an interference cancellation apparatus for a main antenna, according to one embodiment of the disclosure.

FIG. 4 depicts a particular embodiment of interference cancellation in a wireless communication system 400 comprising a main antenna 402 as opposed to a diversity antenna illustrated in FIGS. 2-3, a transceiver 406 and an apparatus for interference cancellation 404 between the antenna 402 and the transceiver 406. The antenna 402 is configured to receive a received signal 409 to be conveyed to an Rx input port 407 of the transceiver 406 via the apparatus 404. The antenna 402 is further configured to transmit a Tx signal from an output port 415 of the power amplifier 433. As the antenna 402 is configured for both reception and transmission at the same time, the transmit signal leaks into the received signal 409. Therefore, the received signal 401 at the antenna port 413 comprises the received signal 409 and a Tx leakage signal 411 from the antenna 402 causing interference.

The apparatus 404 is configured to reduce/cancel the interference in the received signal 401 at the antenna port 413. The apparatus 404 is located downstream of the main antenna 402 and is configured to receive the Rx signal 401 from the antenna port 413 and convey the Rx signal 401 to the Rx input port 407 of the transceiver 406. In one embodiment, the apparatus 404 comprises a receive signal path 403 configured to receive an overall Rx signal 420 sampled via an Rx filter 416 from the received signal 409 at the antenna port 413. The overall Rx signal 420 comprises the Rx signal 409 and a residual Tx signal. The residual Tx signal can comprise a portion of the Tx leakage signal 411 coupled to the Rx signal 409 at the antenna port 413. The apparatus 404 further comprises a transmit signal path 405 configured to convey an overall Tx signal 422 from the output port 415 of the power amplifier 433 to the main antenna port 413. The overall Tx signal 422, for example, comprises a Tx signal at Rx frequency and a Tx signal at Tx frequency.

Additionally, the apparatus 404 comprises a cancellation unit 408, a first compensation unit 410, a second compensation unit 412, a Tx filter 418 and a feedback receiver unit 414. The cancellation unit 408 is located downstream of an Rx filter 416 in the receive signal path 403 and is configured to receive the overall Rx signal 420 at a first input of the cancellation unit 408, a first cancellation signal 426a at a second input of the cancellation unit 408 and a second cancellation signal 428a at a third input of the cancellation unit 408. The cancellation unit 408 of FIG. 4 further comprises a coupling unit 421 configured to sample the residual Tx signal from the overall Rx signal 420 and provide the residual Tx output signal 424 at a first output of the cancellation unit 408 and a subtractor unit 423 configured to subtract the first cancellation signal 426a and the second cancellation signal 428a from the overall Rx signal 420 and provide a cancellation of the Tx signal at the Rx frequency and the Tx signal at the Tx frequency to generate a Rx signal with reduced interference 434 at a second output of the cancellation unit 408. In some embodiments, the subtractor unit 423 comprises a first subtractor and a second subtractor, however, in other embodiments, the subtractor unit 423 comprises only one subtractor configured to generate the Rx signal with reduced interference 434. Alternatively, the cancellation unit 408 can comprise a combiner unit configured to combine the first cancellation signal 426a and the second cancellation signal 428a with the overall Rx signal 420, wherein the first cancellation signal 426a and the second cancellation signal 428a are 180 degree out of phase with the residual Tx signal in the overall Rx signal 420, thereby resulting in the subtraction of the first cancellation signal 426a and the second cancellation signal 428a from the overall Rx signal 420.

In one embodiment, the cancellation unit 408 is implemented by using a bi-directional coupler having 2 inputs and 2 outputs. The bi-directional coupler implements both the coupling unit 421 and the subtractor unit 423, however, in other embodiments, the coupling unit 421 and the subtractor unit 423 can be implemented by 2 different circuit elements.

The first compensation unit 410 is located in a first branch 405a of the transmit signal path 405 and is configured to receive a Tx signal at Rx frequency sampled via an Rx filter 434 from the overall Tx signal 422, at an input of the first compensation unit 410. The first compensation unit 410 further comprises an attenuation unit 410a and a phase shift unit 410b and is configured to modify the Tx signal at Rx frequency by providing an attenuation or phase shift, or both, to the Tx signal at Rx frequency, thereby generating the first cancellation signal 426 at an output of the compensation unit 410. The attenuation and/or phase shift to be applied to the Tx signal at Rx frequency is derived based on the compensation control signal 430 from the feedback receiver unit 414. In some implementations, both attenuation and phase shift are applied to the Tx signal at Rx frequency at the same time, however, in other implementations, either attenuation alone or phase shift alone can be applied at one time.

The second compensation unit 412 is located in a second branch 405b of the transmit signal path 405 and is configured to receive the overall Tx signal 422. The second compensation unit 412 further comprises an attenuation unit 412a and a phase shift unit 412b and is configured to modify the overall Tx signal 422 by providing an attenuation or phase shift or both to the overall Tx signal 422, thereby generating a Tx signal 428 at an output of the second compensation unit 412. The attenuation and phase shift to be applied by the second compensation unit 412 is provided by the compensation control signal 432 from the feedback receiver unit 414. A Tx filter 436 is located downstream of the second compensation unit 412 and is configured to sample the Tx signal at a Tx frequency from the Tx signal 428 and generate the second cancellation signal 428a/428b. In some implementations, both attenuation and phase shift are applied to the overall Tx signal 422 at the same time, however, in other implementations, either attenuation alone or phase shift alone can be applied at one time.

The feedback receiver 414 of FIG. 4 comprises a first input configured to receive the residual Tx output signal PTx,R 424 from the cancellation unit 408, a second input configured to receive the first cancellation signal PTx,C1 426b from the first compensation unit 410 and a third input configured to receive the second cancellation signal PTx,C2 428b from the second compensation unit 412, and is configured to generate the first compensation control signal 430 and the second compensation control signal 432 at an output of the feedback receiver unit 414. In some embodiments, the feedback receiver 414 and the power amplifier 433 are separate from the transceiver 406 as illustrated, however, in other embodiments, the feedback receiver 414 and/or the power amplifier 433 may be a part of the transceiver 406. The first compensation control signal 430 is generated based on a comparison between the residual Tx output signal PTx,R 424 and the first cancellation signal PTx,C1 426b and the second compensation control signal 432 is generated based on a comparison between the residual Tx output signal PTx,R 424 and the second cancellation signal PTx,C2 428b. The feedback receiver 414 operates to provide the first compensation control signal 430 to the first compensation unit 410 and the second compensation control signal 432 to the second compensation unit 412, thereby providing a closed loop control of the interference cancellation.

Figure 5:
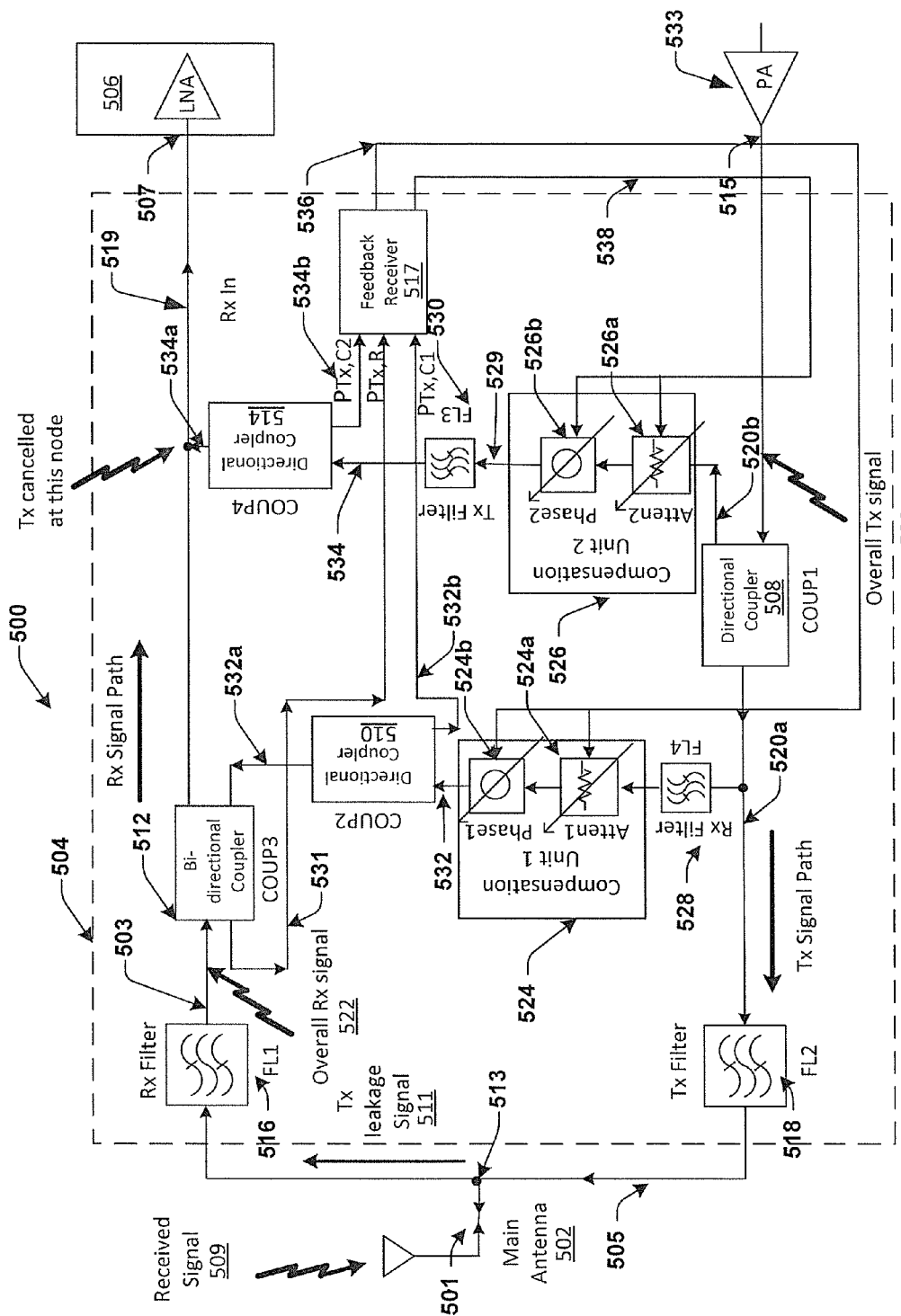
FIG. 5 shows an example implementation of a wireless communication system 500 comprising an interference cancellation apparatus for a main antenna, according to another embodiment of the disclosure.

FIG. 5 depicts an example implementation of interference cancellation in a wireless communication system 500 with a main antenna according to one embodiment of the disclosure. The wireless communication system 500 comprises an antenna 502, a transceiver 506 and an apparatus for interference cancellation 504 between the antenna 502 and the transceiver 506. The antenna 502 is configured to receive a received signal 509 to be conveyed to an Rx input port 507 of the transceiver 506 via the apparatus 504. The antenna 502 is further configured to transmit a Tx signal from an output port 515 of the power amplifier 533. As the antenna 502 is configured for both reception and transmission at the same time, the transmit signal leaks into the received signal 509. Therefore, the received signal 501 at the antenna port 513 comprises the received signal 509 and a Tx leakage signal 511 from the antenna 502 causing interference.

The apparatus 504 is configured to reduce/cancel the interference in the received signal 501 at the antenna port 513. The apparatus 504 is located downstream of the antenna 502 and is configured to receive the received signal 501 from the antenna port 513 and convey the received signal 501 to the Rx input port 507 of the transceiver 506. The apparatus 504 comprises a receive signal path 503 configured to receive an overall Rx signal 522 sampled via an Rx filter 516 from the received signal 501 at the antenna port 513. The overall Rx signal 522 comprises the Rx signal 509 and a residual Tx signal. The residual Tx signal can be a portion of the Tx leakage signal 511 coupled to the Rx signal 509 at the antenna port 513. The apparatus 504 further comprises a transmit signal path 505 configured to convey an overall Tx signal 520 from a the output port 515 of the power amplifier 533 to the antenna port 513. The overall Tx signal 520, for example, comprises a Tx signal at Rx frequency and a Tx signal at Tx frequency.

Additionally, the apparatus 504 comprises a first coupling unit 508, a second coupling unit 510, a third coupling unit 512, a fourth coupling unit 514, a first compensation unit 524, a second compensation unit 526 and a feedback receiver unit 517. The first coupling unit 508 comprises a directional coupler having an input and two outputs and is configured to sample the overall Tx signal 520 at the Tx output port 515 of the power amplifier 533 and generate a first overall Tx signal 520a at a first output thereof and a second overall Tx signal 520b at a second output thereof. The second coupling unit 510 comprises a directional coupler having an input and two outputs and is configured to sample a modified signal 532 comprising a Tx signal at Rx frequency at an output of the first compensation unit 524 and generate a first coupled signal 532a at a first output thereof and a second coupled signal 532b at a second output thereof. The first coupled signal 532a and the second coupled signal 532b comprises the Tx signal at Rx frequency from the first overall Tx signal 520a.

The third coupling unit 512 comprises a bi-directional coupler having 4 ports and is configured to receive the overall Rx signal 522 at a first input and sample the residual Tx signal from the overall Rx signal 522 to generate a residual Tx output signal 531 at a first output thereof. Further, the third coupling unit 512 is configured to receive the first coupled signal 532a at a second input and cancel the first coupled signal 532a from the overall Rx signal 522, thereby generating a cancellation of the Tx signal at Rx frequency from the overall Rx signal 522. The fourth coupling unit 514 comprises a directional coupler having an input and two outputs and is configured to sample a modified signal 534 comprising a Tx signal at Tx frequency and generate a third coupled signal 534a at a first output thereof and a fourth coupled signal 534b at a second output thereof. The third coupled signal 534a and the fourth coupled signal 534b comprises the Tx signal at Tx frequency from the second overall Tx signal 520b. The third coupled signal 534a is applied to the second output of the third coupling unit 512, thereby generating a cancellation of the Tx signal at Tx frequency from the overall Rx signal 522 to generate an Rx signal 519 with reduced interference content at the Rx input port 507 of the transceiver 506.

The first compensation unit 524 is located in a first branch of the transmit signal path 505 at the first output of the first coupling unit 508 and is configured to receive the Tx signal at Rx frequency sampled via an Rx filter 528 from the first overall Tx signal 520a, at an input of the first compensation unit 524. The first compensation unit 524 further comprises an attenuation unit 524a and a phase shift unit 524b and is configured to modify the Tx signal at Rx frequency at its input by providing an attenuation or phase shift or both to the Tx signal at Rx frequency, thereby generating the modified signal 532 at an output of the compensation unit 524. The attenuation and phase shift to be applied to the Tx signal at Rx frequency is provided by the compensation control signal 536 from the feedback receiver unit 517. In some implementations, both attenuation and phase shift are applied to the Tx signal at Rx frequency at the same time, however, in other implementations, either attenuation alone or phase shift alone can be applied at one time.

The second compensation unit 526 is located in a second branch of the transmit signal path 505 at the second output of the first coupling unit 508 and is configured to receive the second overall Tx signal 520b. The second compensation unit 526 further comprises an attenuation unit 526a and a phase shift unit 526b and is configured to modify the second overall Tx signal 520b by providing an attenuation or phase shift or both to the second overall Tx signal 520*b*, thereby generating a Tx signal 529 at an output of the second compensation unit 526. The attenuation and phase shift to be applied by the second compensation unit 526 is provided by the compensation control signal 538 from the feedback receiver unit 517. A Tx filter 530 is located downstream of the second compensation unit 526 and is configured to sample the Tx signal at Tx frequency from the Tx signal 529 and generate the modified signal 534. In some implementations, both attenuation and phase shift are applied to the overall Tx signal 520*b* at the same time, however, in other implementations, either attenuation alone or phase shift alone can be applied one at a time.

The feedback receiver 517 of FIG. 5 comprises a first input configured to receive the residual Tx output signal PTx,R 531 from the third unit 512, a second input configured to receive the second coupled signal PTx,C1 532*b* comprising the Tx signal at Rx frequency from the second coupling unit 510 and a third input configured to receive the fourth coupled signal PTx,C2 534*b* comprising the Tx signal at Tx frequency from the fourth coupling unit 514 and is configured to generate the first compensation signal 536 and the second compensation signal 538 at an output of the feedback receiver unit 517. The first compensation signal 536 is generated based on a comparison between the residual Tx output signal PTx,R 531 and the second coupled signal PTx,C1 532*b* and the second compensation signal 538 is generated based on a comparison between the residual Tx output signal PTx,R 531 and the fourth coupled signal PTx,C2 534*b*. The feedback receiver 517 operates to provide the first compensation signal 536 to the first compensation unit 524 and the second compensation signal 538 to the second compensation unit 526, thereby providing a closed loop control of the interference cancellation.

Figure 9:
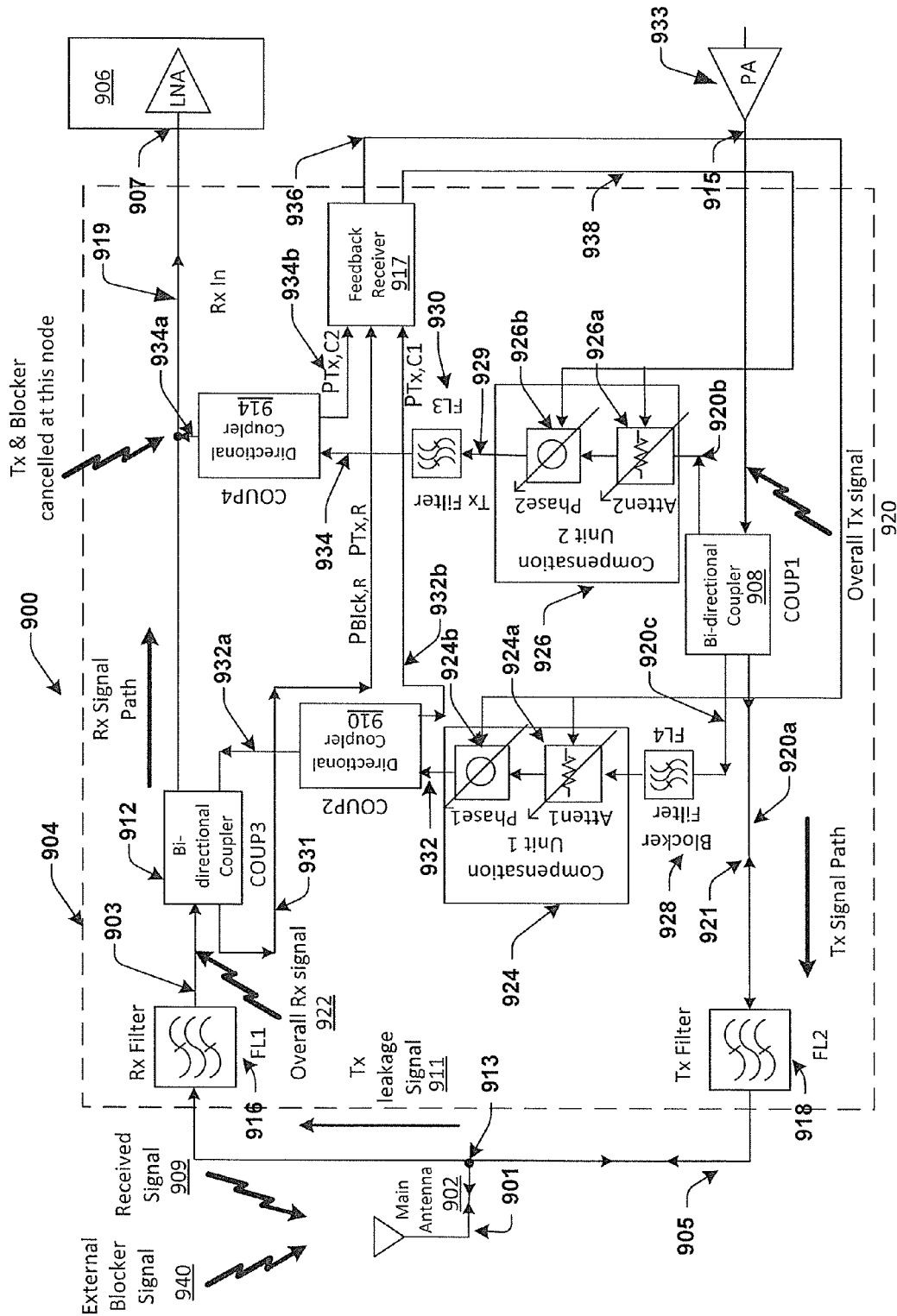
FIG. 9 shows another example implementation of a wireless communication system 900 comprising an interference cancellation apparatus for a main antenna, according to another embodiment of the disclosure.

FIG. 9 depicts an example implementation of interference cancellation in a wireless communication system 900 with a main antenna according to another embodiment of the disclosure. The wireless communication system 900 comprises an antenna 902, a transceiver 906 and an apparatus for interference cancellation 904 between the antenna 902 and the transceiver 906. The antenna 902 is configured to receive a received signal 909 to be conveyed to an Rx input port 907 of the transceiver 906 via the apparatus 904. The antenna 902 is further configured to transmit an overall transmit signal 920 from an output port 915 of the power amplifier 933. As the antenna 902 is configured for both reception and transmission at the same time, a portion of the overall transmit signal 920 i.e., a Tx leakage signal 911 leaks into the received signal 909. Further, the antenna 902 receives an external blocker signal 940. Therefore, the received signal 901 at the antenna port 913 comprises the received signal 909, the external blocker signal 940 and the Tx leakage signal 911 from the antenna 902 both causing interference.

The apparatus 904 is configured to reduce/cancel the interference in the received signal 901 at the antenna port 913. The apparatus 904 is located downstream of the antenna 902 and is configured to receive the received signal 901 from the antenna port 913 and convey the received signal 901 to the Rx input port 907 of the transceiver 906. The apparatus 904 comprises a receive signal path 903 configured to receive an overall Rx signal 922 sampled via an Rx filter 916 from the received signal 901 at the antenna port 913. Due to the limitations of the Rx filter 916, the external blocker signal 940 appearing at the antenna port 913 may not have sufficient attenuation and also appears in the overall Rx signal 922. Therefore, the overall Rx signal 922 comprises the Rx signal 909, a residual blocker signal and a residual Tx signal. The residual blocker signal can be a portion of the external blocker signal 940 coupled to the Rx signal 909 at the antenna port 913. The apparatus 904 further comprises a transmit signal path 905 configured to convey an overall Tx signal 920 from the output port 915 of the power amplifier 933 to the antenna port 913.

Additionally, the apparatus 904 comprises a first coupling unit 908, a second coupling unit 910, a third coupling unit 912, a fourth coupling unit 914, a first compensation unit 924, a second compensation unit 926 and a feedback receiver unit 917. The first coupling unit 908 comprises a bi-directional coupler having four ports and is configured to sample the overall Tx signal 920 at the Tx output port 915 of the power amplifier 933 and generate a first overall Tx signal 920*a* at a first output thereof and a second overall Tx signal 920*b* at a second output thereof. Further, the first coupling unit 908 samples a blocker leakage signal 921 (associated with the external blocker signal 940) leaking through the Tx filter 918, and generates a blocker signal 920*c* at a third output thereof, which is fed to a blocker filter 928 tuned to a blocker frequency. The second coupling unit 910 comprises a directional coupler having an input and two outputs and is configured to sample a modified signal 932 comprising a blocker signal at an output of the first compensation unit 924 and generate a first coupled signal 932*a* at a first output thereof and a second coupled signal 932*b* at a second output thereof. The first coupled signal 932*a* and the second coupled signal 932*b* comprises the blocker signal associated with the modified signal 932. In one embodiment the blocker signal can be an external input received by the main antenna 902. In another embodiment, the blocker can be the Tx signal 905 reflected by the main antenna 902 due to impedance mismatch, in which case the filter 928 would be tuned to the Tx frequency.

The third coupling unit 912 comprises a bi-directional coupler having 4 ports and is configured to receive the overall Rx signal 922 at a first input and sample the residual Tx signal and the residual blocker signal from the overall Rx signal 922 to generate a residual output signal 931 at a first output thereof. Further, the third coupling unit 912 is configured to receive the first coupled signal 932*a* at a second input and cancel the first coupled signal 932*a* from the overall Rx signal 922, thereby generating a cancellation of the residual blocker signal in the receive signal path 903. The fourth coupling unit 914 comprises a directional coupler having an input and two outputs and is configured to sample a modified signal 934 comprising a Tx signal at Tx frequency and generate a third coupled signal 934*a* at a first output thereof and a fourth coupled signal 934*b* at a second output thereof. The third coupled signal 934*a* and the fourth coupled signal 934*b* comprises the Tx signal at Tx frequency associated with the second overall Tx signal 920*b*. The third coupled signal 934*a* is applied to the second output of the third coupling unit 912, thereby generating a cancellation of the residual Tx signal in the receive signal path 903 to generate an Rx signal 919 with reduced interference at the Rx input port 907 of the transceiver 906

The first compensation unit 924 is located in a first branch of the transmit signal path 905 at the third output of the first coupling unit 908 and is configured to receive the blocker signal leaking through the Tx filter 918 sampled by the first coupling unit 908 from the first overall Tx signal 920*a* and delivered to the blocker filter 928 at an input of the first compensation unit 924. The first compensation unit 924 further comprises an attenuation unit 924*a* and a phase shift unit 924*b* and is configured to modify the blocker signal at its input by providing an attenuation or phase shift or both to the blocker signal, thereby generating the modified signal 932 at an output of the compensation unit 924. The attenuation and phase shift to be applied to the blocker signal is provided by the compensation control signal 936 from the feedback receiver unit 917.

The second compensation unit 926 is located in a second branch of the transmit signal path 905 at the second output of the first coupling unit 908 and is configured to receive the second overall Tx signal 920b. The second compensation unit 926 further comprises an attenuation unit 926a and a phase shift unit 926b and is configured to modify the second overall Tx signal 920b by providing an attenuation or phase shift or both to the second overall Tx signal 920b, thereby generating a Tx signal 929 at an output of the second compensation unit 926. The attenuation and phase shift to be applied by the second compensation unit 926 is provided by the compensation control signal 938 from the feedback receiver unit 917. A Tx filter 930 is located downstream of the second compensation unit 926 and is configured to sample the Tx signal at Tx frequency from the Tx signal 929 and generate the modified signal 934.

The feedback receiver 917 of FIG. 9 comprises a first input configured to receive the residual output signal 931 comprising the residual Tx signal $P_{Tx,R}$ and the residual blocker signal $P_{Blck,R}$ from the third coupling unit 912, a second input configured to receive the second coupled signal PTx,C1 932b comprising the blocker signal from the second coupling unit 910 and a third input configured to receive the fourth coupled signal PTx,C2 934b comprising the Tx signal at Tx frequency from the fourth coupling unit 914 and is configured to generate the first compensation signal 936 and the second compensation signal 938 at an output of the feedback receiver unit 917. In some implementations, the measured blocker signal power $P_{Blck,R}$ is compared to a predetermined threshold, $P_{Blck,th}$ and the cancellation of the residual blocker signal is enabled only when the measured blocker signal power $P_{Blck,R}$ is greater than the predetermined threshold, $P_{Blck,th}$. The first compensation signal 936 is generated based on a comparison between the residual output signal 931 and the second coupled signal PTx,C1 932b and the second compensation signal 938 is generated based on a comparison between the residual output signal 931 and the fourth coupled signal PTx,C2 934b. The feedback receiver 917 operates to provide the first compensation signal 936 to the first compensation unit 924 and the second compensation signal 938 to the second compensation unit 926, thereby providing a closed loop control of the interference cancellation.

In some embodiments, the transmit signal path 905 in the apparatus for interference cancellation 904 comprises an additional branch comprising a third compensation unit and a fifth coupling unit (not shown), configured to provide a cancellation of a Tx signal at Rx frequency in the residual Tx signal in the receive signal path 903. In some implementations, this additional branch is implemented similar to the branch comprising the compensation unit 524, the Rx filter 528 and the directional coupler 510 in FIG. 5. Further, in such implementations, the transmit path 905 comprises a directional coupler similar to the directional coupler 508 in FIG. 5.

In some embodiments, the apparatus for interference cancellation 304 in FIG. 3 is also configured to provide a cancellation of an external blocker signal in the receive signal path 303, similar to the apparatus for interference cancellation 904 in FIG. 9. In such embodiments, the cancellation path 305 in the apparatus for interference cancellation 304 comprises an additional branch comprising a second compensation unit and a second directional coupler (not shown), configured to provide a cancellation of the external blocker signal in the overall Rx signal 316 in the receive signal path 303. In some implementations, this additional branch is implemented similar to the branch comprising the blocker filter 928, the compensation unit 924 and the directional coupler 910 in FIG. 9.

FIG. 6a depicts an example implementation of a feedback receiver unit 600, according to one embodiment of the disclosure. This feedback receiver 600 can be implemented in any of the embodiments in FIGS. 2, 3, 4, 5 and 9. Further, other implementations of the feedback receiver unit are also possible. The feedback receiver unit 600 in FIG. 6a comprises a switch 602 having two inputs configured to convey signals received at its inputs. In one embodiment, the first input comprises a residual Tx signal, PTx, residual 601 and the second input comprises a cancellation signal PTx, cancellation 603. In some implementations, the switch 602 has a third input comprising, for example, a blocker signal (not shown). The feedback receiver unit 600 further comprises a low noise amplifier LNA 604 which is configured to receive the output of the switch 602. The output of the LNA 604 is then passed through a mixer 606. In addition, the feedback receiver unit 600 comprises a filter and ADC component 608 configured to receive the output of the mixer 606. The output of the filter and ADC component 608 is then passed to a calculation component 610, which is configured to calculate a final compensation control signal, comprising a required attenuation and/or a required phase shift. The calculation component 610 can comprise a controller unit configured to compute the required attenuation and/or the required phase shift. The residual Tx signal, PTx,residual 601 sampled from the receive signal path, for example, is given by, $$P_{Tx,residual}=P_{Tx,R}e^{j(\omega t+\phi(t))}e^{-j\theta_{Tx,R}} \qquad (1)$$

The Tx power sampled from the cancellation path PTx, cancellation 603, for example, is given by, $$P_{Tx,cancellation}=P_{Tx,C}e^{j(\omega t+\phi(t))}e^{-j\theta_{Tx,C}} \qquad (2)$$

The magnitudes $P_{Tx,R}$ and $P_{Tx,C}$ and the phases $\theta_{Tx,R}$ and $\theta_{Tx,C}$ of the residual signal and the cancellation signal respectively are computed in the feedback receiver unit 600. To compute the required attenuation and the phase shift, the effects of the directional couplers used in the architecture needs to be included.

FIG. 6b depicts an example implementation of a bi-directional coupler 620 having four ports P1, P2, P3 and P4. The relevant port relationships of the bi-directional coupler 620 is given by, $$P2=P4-CF1 \qquad (3a)$$

$$P3=P1-CF1 \qquad (3b)$$

$$P2=P1-IL1 \qquad (3c)$$

$$\theta_2=\theta_4+\theta_{CF1}=\theta_4+90° \qquad (3d)$$

$$\theta_3=\theta_1\theta_{CF1}=\theta_1+90° \qquad (3e)$$

$$\theta_2=\theta_1-\theta_{21} \qquad (3f)$$

FIG. 6c depicts an example implementation of a directional coupler 640 having three ports P1, P2 and P3. The relevant port relationships of the directional coupler 640 is given by, $$P3=P1-CF1 \qquad (4a)$$

$$P2=P1-IL2 \qquad (4b)$$

$$\theta_3 = \theta_1 + \theta_{CF1} = \theta_1 + 90° \quad (4c)$$

$$\theta_2 = \theta_1 - \theta_{21} \quad (4d)$$

Using the above relationships, the required attenuation and the required phase shift in the cancellation path so as to enable a cancellation of the Tx power at the Rx port of a transceiver can be derived. For example, based on FIG. 3, the required attenuation is computed as:

$$\text{Attenuation} = \text{Attenuation\_previous} + \Delta\text{Attenuation} \quad (5)$$

$$\Delta\text{Attenuation} = P_{Tx,C} - P_{Tx,R} + (CF1 - 2CF2) - (IL1 - IL2) \quad (6)$$

Where $P_{Tx,C}$ and $P_{Tx,R}$ are the quantities measured by the feedback receiver, CF1, IL1 are the coupling factor and insertion loss of COUP1 and CF2, IL2 are the coupling factor and insertion loss of COUP2 respectively.

Similarly, the required phase shift in the cancellation path is computed as:

$$\text{Phase shift} = \text{Phase shift\_previous} + \Delta\text{phase} \quad (7)$$

$$\Delta\text{Phase} = \theta_{Tx,R} - \theta_{Tx,C} + 90° - (\theta_2 - \theta_1) \quad (8)$$

Where $\theta_{Tx,C}$ and $\theta_{Tx,R}$ are the quantities measured by the feedback receiver, and $\theta_1$ and $\theta_2$ are the phase shift parameters of COUP1 and COUP2 respectively.

Based on FIG. 5, the computation of Atten1 and Phase 1 for the cancellation of the Tx power at Rx frequencies is computed as:

$$\text{Attenuation1} = \text{Attenuation1\_previous} + \Delta\text{Attenuation1} \quad (9)$$

$$\Delta\text{Attenuation1} = P_{Tx,C1} - P_{Tx,R} + (CF2 - 2CF3) - (IL2 - IL3) \quad (10)$$

$$\text{Phase shift1} = \text{Phase shift1\_previous} + \Delta\text{Phase1} \quad (11)$$

$$\Delta\text{Phase1} = \theta_{Tx,R} - \theta_{Tx,C1} + 90° - (\theta_3 - \theta_2) \quad (12)$$

Where $P_{Tx,C1}$, $P_{Tx,R}$, $\theta_{Tx,C1}$ and $\theta_{Tx,R}$ are the quantities measured by the feedback receiver, CF2, IL2 and $\theta_2$ are the coupling coefficient, insertion loss and phase shift of COUP2 and CF3, IL3 and θ3 are the coupling coefficient, insertion loss and phase shift of COUP3 respectively.

Similarly, based on FIG. 5, the computation of Atten2 and Phase 2 for the cancellation of the Tx power at Tx frequencies is computed as:

$$\text{Attenuation2} = \text{Attenuation2\_previous} + \Delta\text{Attenuation2} \quad (13)$$

$$\Delta\text{Attenuation2} = P_{Tx,C2} - P_{Tx,R} + (CF4 - CF3) - (IL4 - IL3) \quad (14)$$

$$\text{Phase shift2} = \text{Phase shift2\_previous} + \Delta\text{Phase2} \quad (15)$$

$$\Delta\text{Phase2} = \theta_{Tx,R} - \theta_{Tx,C2} + 90° - (\theta_3 - \theta_4) \quad (16)$$

Where $P_{Tx,C2}$, $P_{Tx,R}$, $\theta_{Tx,C2}$ and $\theta_{Tx,R}$ are the quantities measured by the feedback receiver, CF4, IL4 and $\theta_4$ are the coupling coefficient, insertion loss and phase shift of COUP4 respectively.

Figure 7A:
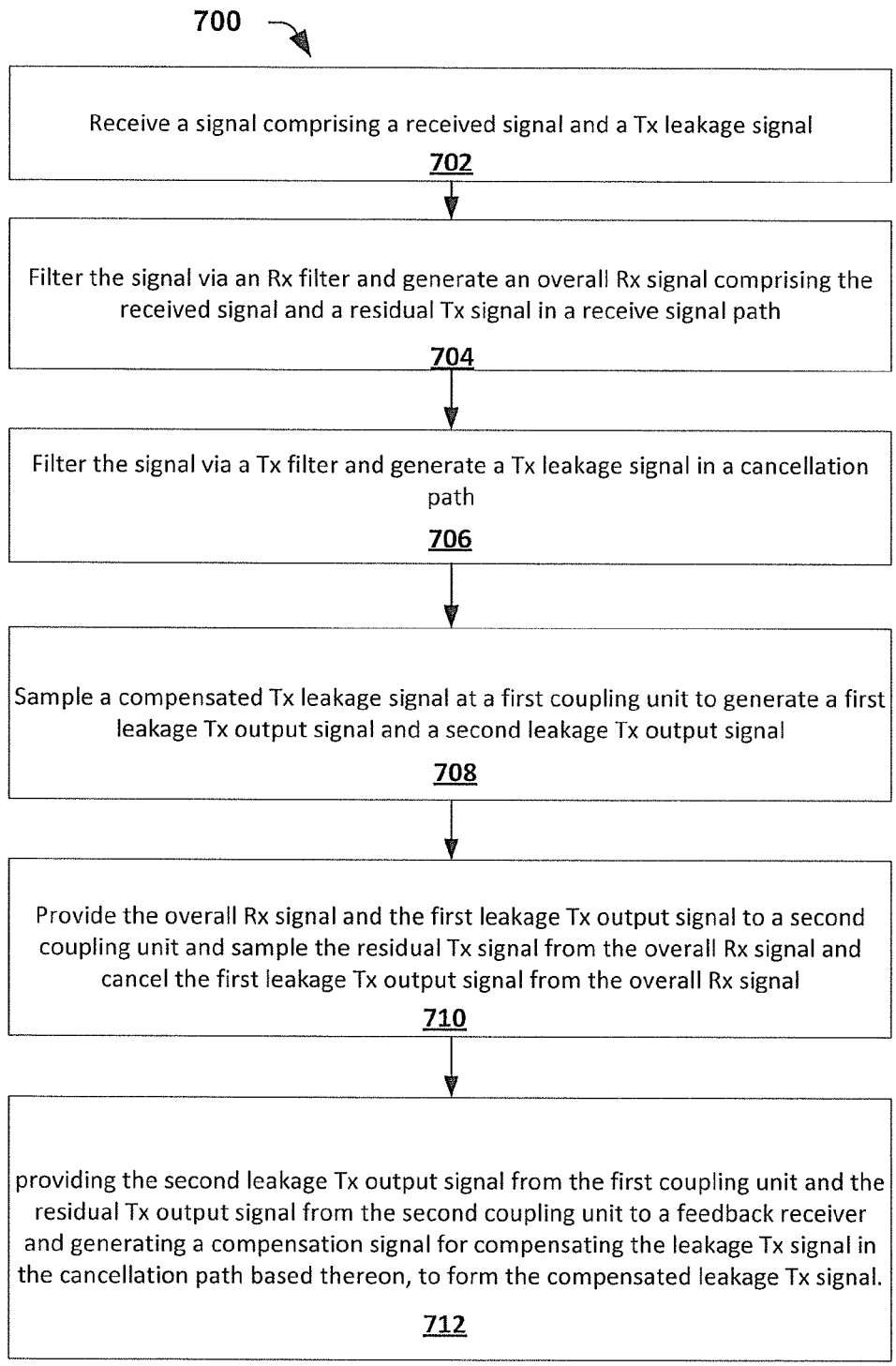
FIG. 7a shows a flowchart of a method for interference cancellation in a wireless communication system for a diversity antenna, according to one embodiment of the disclosure.

FIG. 7a shows a flowchart of a method for interference cancellation in a wireless communication system for a diversity antenna according to one embodiment of the disclosure. The method 700 is described herein with reference to the diversity antenna 300, however, the method can also be applied to other diversity antenna configurations, as illustrated in FIG. 2. At 702, a signal 315 comprising the received signal 309 and the Tx leakage signal 311 is received at the input of the apparatus 304. At 704, the signal 315 is filtered via the Rx filter 320 to generate the overall Rx signal 316 comprising the received signal 309 and a residual Tx signal. At 706, the signal 315 is filtered via the Tx filter 322 to generate the Tx leakage signal 318. At 708, a compensated Tx leakage signal 328 is sampled at a directional coupler 308 to generate a first leakage Tx output signal 328a and a second leakage Tx output signal 328b. At 710, the overall Rx signal 316 and the first leakage Tx output signal 328a is provided to the bi-directional coupler 310 and the residual Tx output signal PTx,R 330 is sampled from the overall Rx signal 316 and the first leakage Tx output signal 328a is cancelled from the overall Rx signal 316. At 712, the second leakage Tx output signal 328b from the first coupling unit and the residual Tx output signal 330 from the second coupling unit are provided to a feedback receiver 314 and a compensation control signal 332 for compensating the leakage Tx signal 318 in the cancellation path 305 is generated based thereon, to form the compensated leakage Tx signal 328.

Figure 7B:
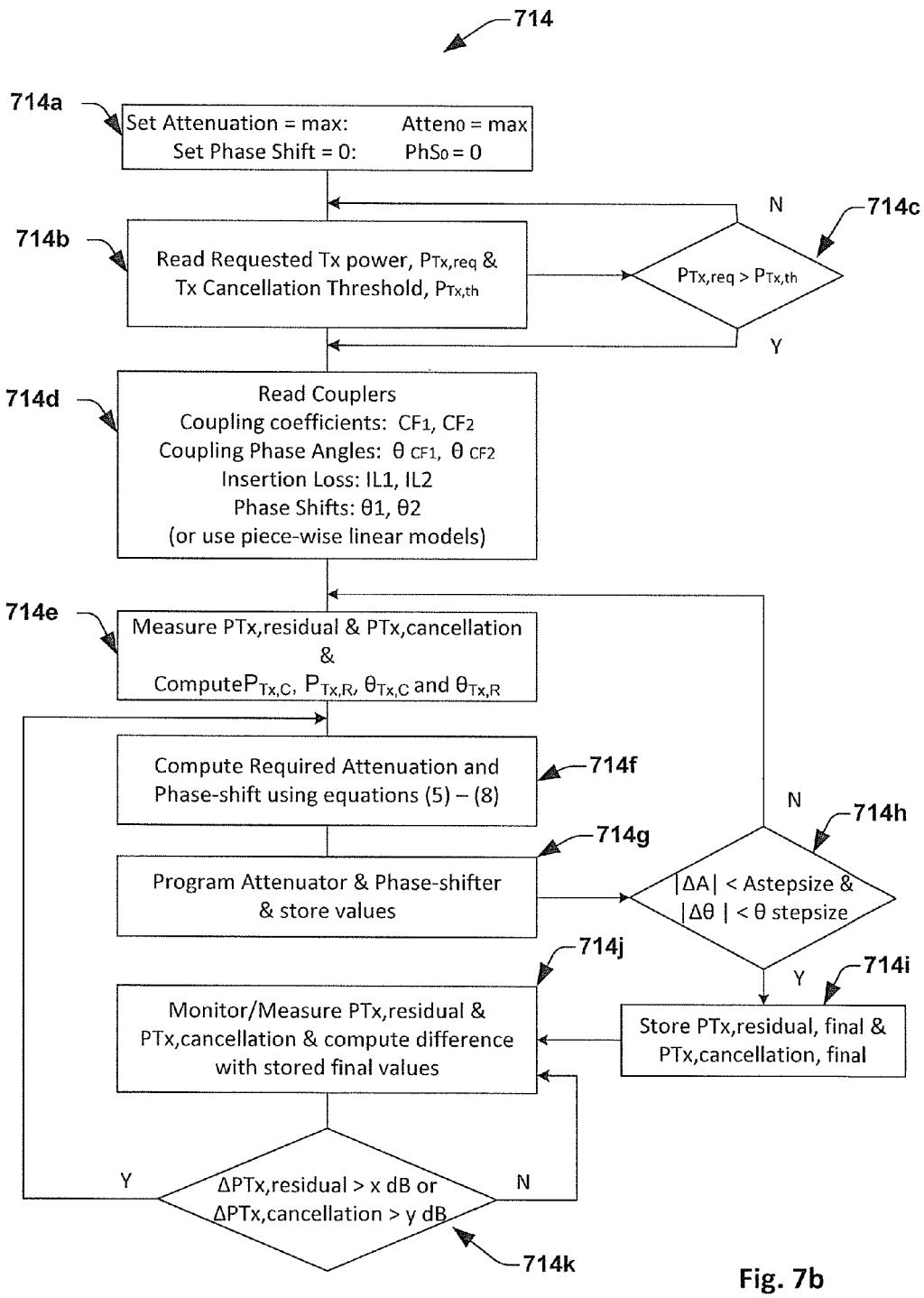
FIG. 7b shows an example implementation of the algorithm for enabling the closed loop control of the cancellation parameters i.e., the attenuation and the phase shift, according to one embodiment of the disclosure.

FIG. 7b depicts an example implementation of the algorithm for enabling a closed loop control of the cancellation parameters i.e., the attenuation and the phase shift given in equations (5)-(8). The algorithm herein is described with reference to the wireless communication system 300 for a diversity antenna in FIG. 3. In one embodiment, this algorithm can be implemented using a controller in the calculation component 610 of the feedback receiver 600 in FIG. 6a. At 714a, the attenuator 324 and the phase shifter 326 are set to an initial value. At 714b, the residual Tx power, PTx,R in the receive signal path 303 and a predetermined cancellation threshold, PTx,th is read. At 714c, a determination whether the PTx,R is greater than the PTx,th is performed. If yes, the method proceeds to 714d. Otherwise, the method loops back to 714b. At 714d, parameters of couplers COUP1 and COUP2 are read. At 714e, residual Tx output signal 330 and the second leakage Tx output signal 328b are measured and the amplitude and phase of the PTx,R 330 and PTx,C 328b are determined. At 714f, the required attenuation and the required phase shift is determined based on equations (5)-(8). At 714g, the attenuator 324 and the phase shifter 326 are programmed based on the values determined at 714f. At 714h, a determination whether the attenuation is less than the attenuator step size and the phase shift is less than the phase shift step size is performed. If No, the method proceeds to the next iteration at 714e, where residual Tx output signal 330 and the second leakage Tx output signal 328b are measured again. If Yes, the method proceeds to 714i, where the computation is stopped and a final value of PTx,R 330 and PTx,C 328b are stored. At 714j, a monitor mode is entered wherein PTx,R 330 and PTx,C 328b are measured and the difference between the final values of PTx,R 330 and PTx,C 328b and the current values of PTx,R 330 and PTx,C 328b are computed. At 714k, a determination whether the computed difference is greater than a threshold value is performed. If yes, the method loops back to 714f where the computation of attenuation and phase shift is started again until convergence is obtained. If No, the method loops back to 714j.

Figure 8:
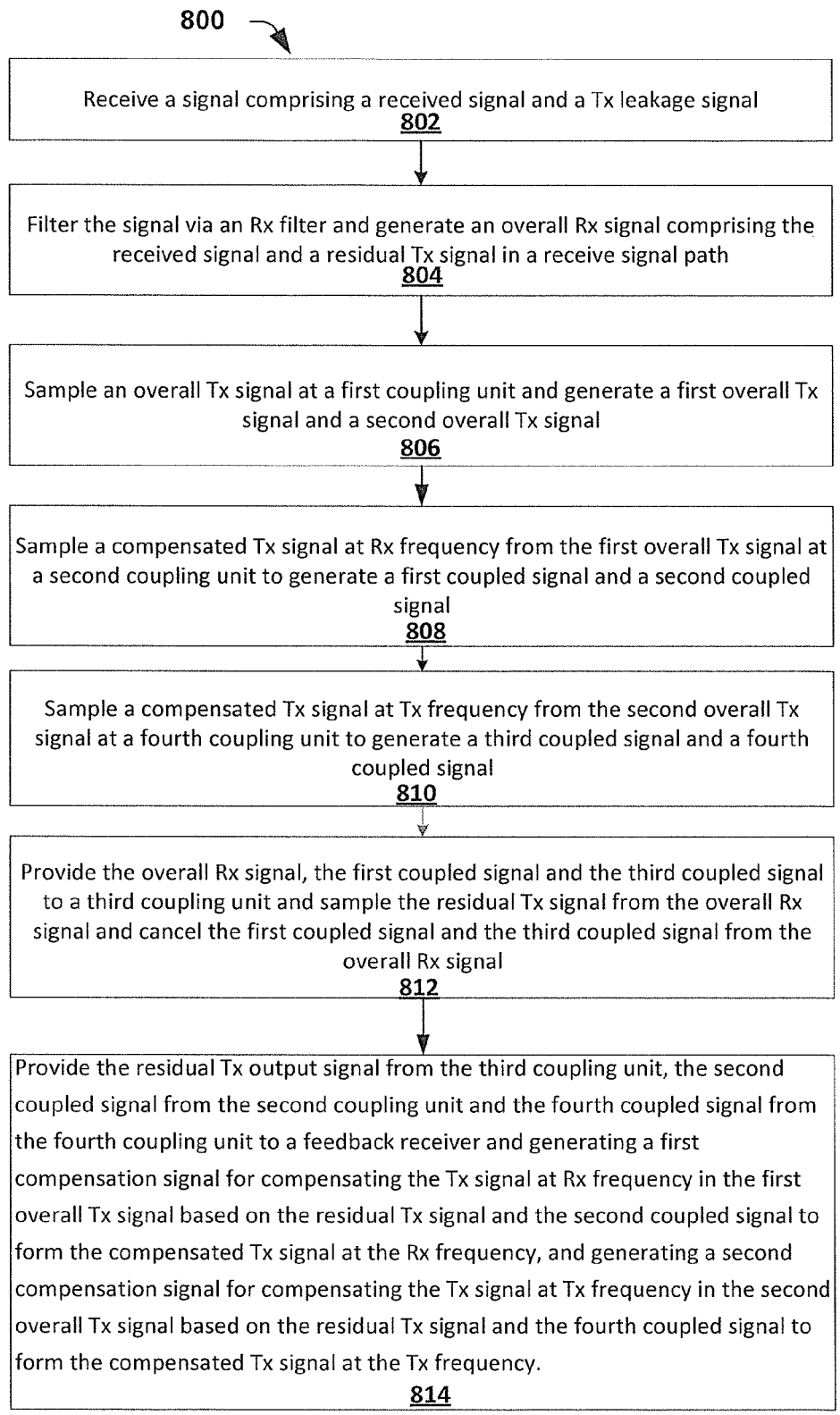
FIG. 8 shows a flowchart of a method for interference cancellation in a wireless communication system for a main antenna, according to one embodiment of the disclosure.

FIG. 8 shows a flowchart of a method for interference cancellation in a wireless communication system for a main antenna according to one embodiment of the disclosure. The method 800 is described herein with reference to the wireless communication system 500, however, the method can also be applied to other wireless communication systems, for example, as illustrated in FIG. 4. At 802, a signal 501 comprising the received signal 509 and the Tx leakage signal 511 is received at the input of the apparatus 504. At 804, the signal 501 is filtered via the Rx filter 516 to generate an overall Rx signal 522 comprising the received signal 509 and a residual Tx signal. At 806, an overall Tx signal 520 is sampled at a first coupling unit 508 to generate a first overall Tx signal 520a and a second overall Tx signal 520b. At 808, a modified Tx signal at a Rx frequency 532 is sampled from the first overall Tx signal 520a at a second coupling unit 510 to generate a first coupled signal 532a and a second coupled signal 532b. At 810, a modified Tx signal at a Tx frequency is sampled from the second overall Tx signal 520b at a fourth coupling unit 514 to generate a third coupled signal 534a and a fourth coupled signal 534b. At 812, the overall Rx signal 503, the first coupled signal 532a and the third coupled signal 534a are provided to a third coupling unit 512 and the residual Tx output signal PTx,R 531 is sampled from the overall Rx signal 522, and the first coupled signal 532a and the third coupled signal 534a are cancelled from the overall Rx signal 522 thereby providing a cancellation of the Tx signal at the Rx frequency and the Tx signal at the Tx frequency from the overall Rx signal 522. At 814, the residual Tx output signal 531 from the third coupling unit 512, the second coupled signal 532b from the second coupling unit 510 and the fourth coupled signal 534b from the fourth coupling unit 514 are provided to a feedback receiver 517 and a first compensation control signal 536 for compensating the Tx signal at the Rx frequency in the first overall Tx signal 520a is generated based on the residual Tx output signal 531 and the second coupled signal 532b, to form the compensated Tx signal at the Rx frequency 532, and a second compensation control signal 538 for compensating the Tx signal at the Tx frequency in the second overall Tx signal 520b is generated based on the residual Tx output signal 531 and the fourth coupled signal 534b, to form the compensated Tx signal at the Tx frequency 534.

Figure 10:
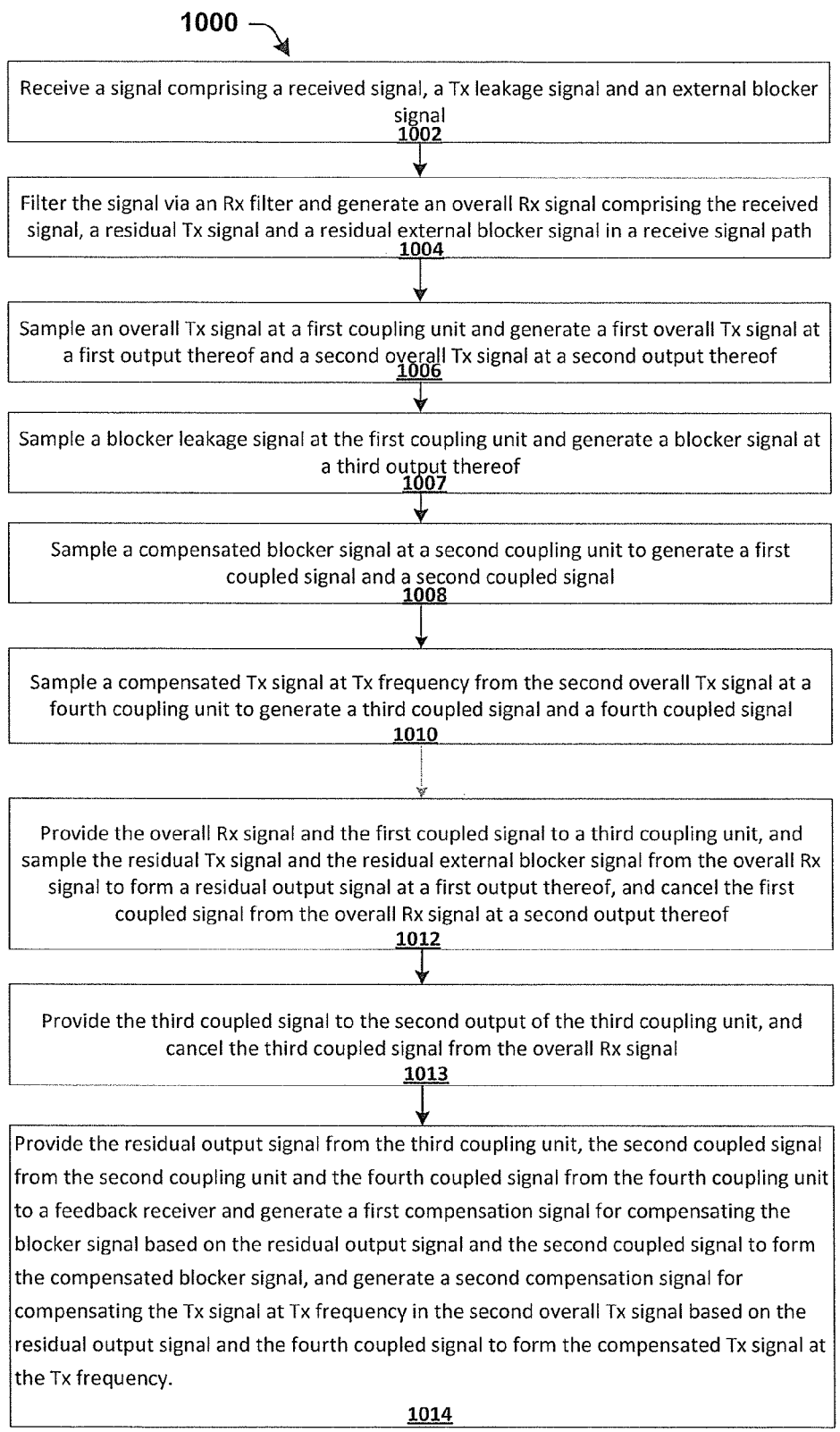
FIG. 10 shows a flowchart of a method for interference cancellation in a wireless communication system for a main antenna, according to one embodiment of the disclosure.

FIG. 10 shows a flowchart of a method for interference cancellation in a wireless communication system for a main antenna according to another embodiment of the disclosure. The method 1000 is described herein with reference to the wireless communication system 900. At 1002, a signal 901 comprising the received signal 909, the blocker signal 940 and the Tx leakage signal 911 is received at the input of the apparatus 904. At 1004, the signal 901 is filtered via the Rx filter 916 to generate an overall Rx signal 922 comprising the received signal 909, a residual blocker signal and a residual Tx signal. At 1006, an overall Tx signal 920 is sampled at a first coupling unit 908 to generate a first overall Tx signal 920aa second overall Tx signal 920b. At 1007, a blocker leakage signal 921 leaking through the Tx filter 918 is sampled by the first coupling unit 908 to generate a blocker signal 920c. At 1008, a compensated blocker signal 932 is sampled at a second coupling unit 910 to generate a first coupled signal 932a and a second coupled signal 932b. At 1010, a compensated Tx signal at a Tx frequency 934 is sampled from the second overall Tx signal 920b at a fourth coupling unit 914 to generate a third coupled signal 934a and a fourth coupled signal 934b. At 1012, the overall Rx signal 922, and the first coupled signal 932a are provided to a third coupling unit 912, a residual output signal 931 comprising the residual Tx signal PTx,R and the residual blocker signal PBlck,R is sampled from the overall Rx signal 922 at a first output thereof and the first coupled signal 932a is cancelled from the overall Rx signal 922 at a second output thereof. At 1013, the third coupled signal 934a is provided to the second output of the third coupling unit 912 and the third coupled signal 934a is cancelled from the overall Rx signal 922. At 1014, the residual output signal 931 from the third coupling unit 912, the second coupled signal 932b from the second coupling unit 910 and the fourth coupled signal 934b from the fourth coupling unit 914 are provided to a feedback receiver 917. A first compensation control signal 936 for compensating the blocker signal 920c is generated from the comparison of the residual output signal 931 and the second coupled signal 932b iteratively to reach the final value of the compensated blocker signal at the blocker frequency 932. A second compensation control signal 938 for compensating the Tx signal at the Tx frequency in the second overall Tx signal 920b is generated from the comparison of the residual output signal 931 and the fourth coupled signal 934b iteratively, to reach the final value of the compensated Tx signal at the Tx frequency 934.

While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus for interference cancellation in a wireless communication system with a diversity antenna configured for reception, comprising: a receive signal path configured to transfer an overall receive (Rx) signal comprising an Rx signal and a residual transmit (Tx) signal, from an antenna port to an Rx input port of a transceiver; at least one cancellation path configured to receive a leakage Tx signal from the antenna port; a cancellation unit configured to apply a cancellation signal, to the overall Rx signal in the receive signal path; a compensation unit configured to generate the cancellation signal by modifying the leakage Tx signal in the cancellation path, based on a compensation control signal; and a feedback receiver unit configured to generate the compensation control signal based on the residual Tx signal and the cancellation signal.

Example 2 is an apparatus including the subject matter of example 1, further comprising a first coupling unit coupled to an output of the compensation unit, configured to sample the cancellation signal, and generate a first leakage Tx output signal at a first output of the first coupling unit and a second leakage Tx output signal at a second output of the first coupling unit, wherein the first leakage Tx output signal and the second leakage Tx output signal are based on the cancellation signal.

Example 3 is an apparatus including the subject matter of examples 1-2, including or omitting elements, wherein the cancellation unit comprises a second coupling unit configured to receive the overall Rx signal and sample the residual Tx signal from the overall Rx signal to generate a residual Tx output signal at a first output of the second coupling unit, and receive the first leakage Tx output signal from the first output of the first coupling unit and cancel the first leakage Tx output signal from the overall Rx signal at a second output of the second coupling unit.

Example 4 is an apparatus including the subject matter of examples 1-3, including or omitting elements, wherein the feedback receiver unit is configured to receive the residual Tx output signal from the first output of the second coupling unit and the second leakage Tx output signal from the second output of the first coupling unit, and generate the compensation control signal for compensating the leakage Tx signal in the cancellation path based on the residual Tx output signal and the second leakage Tx output signal.

Example 5 is an apparatus including the subject matter of examples 1-4, including or omitting elements, wherein the compensation unit further comprise an attenuation unit or phase shift unit, configured to modify the leakage Tx signal by applying an attenuation or a phase shift, to generate the cancellation signal, prior to sampling the cancellation signal in the first coupling unit.

Example 6 is an apparatus including the subject matter of examples 1-5, including or omitting elements, wherein the compensation control signal comprises the attenuation or the phase shift, to be applied to the leakage Tx signal in the cancellation path, and wherein the feedback receiver is configured to enable a closed loop cancellation of the residual Tx signal in the receive signal path by selectively applying the attenuation and the phase shift to the leakage Tx signal in the cancellation path based on a predetermined threshold.

Example 7 is an apparatus including the subject matter of examples 1-6, including or omitting elements, wherein the first coupling unit comprises a directional coupler comprising an input configured to receive the cancellation signal, a first output configured to generate the first leakage Tx output signal to the second coupling unit and a second output configured to provide the second leakage Tx output signal to the feedback receiver, wherein the directional coupler is configured to sample the cancellation signal to generate the first leakage Tx output signal and the second leakage Tx output signal.

Example 8 is an apparatus including the subject matter of examples 1-7, including or omitting elements, wherein the second coupling unit comprises a bi-directional coupler comprising a first input configured to receive the overall Rx signal in the receive signal path, a second input configured to receive the first leakage Tx output signal from the first coupling unit, a first output configured to generate the residual Tx output signal to the feedback receiver and a second output configured to generate a Rx signal with reduced interference to the Rx input port of a transceiver, wherein the bi-directional coupler is configured to sample the residual Tx signal from the overall Rx signal to generate the residual Tx output signal, and cancel the first leakage Tx output signal from the overall Rx signal to generate the Rx signal with reduced interference.

Example 9 is an apparatus including the subject matter of examples 1-8, including or omitting elements, further comprising an Rx filter coupled between the antenna port and the second coupling unit in the receive signal path configured to filter out the leakage Tx signal from the Rx signal, and a Tx filter coupled between the antenna port and the compensation unit in the cancellation path configured to filter out the Rx signal from the leakage Tx signal.

Example 10 is an apparatus for interference cancellation in a wireless communication system with a main antenna, comprising: a receive signal path configured to transfer an overall receive (Rx) signal comprising an Rx signal and a residual interference signal from an antenna port to an Rx input port of a transceiver; a transmit signal path configured to transfer an overall Tx signal, from an output port of a power amplifier to the antenna port; a cancellation unit configured to apply a first cancellation signal, and a second cancellation signal to the overall Rx signal in the receive signal path; a first compensation unit configured to generate the first cancellation signal by modifying a first interference signal in the transmit signal path, based on a first compensation control signal; a second compensation unit configured to generate the second cancellation signal by modifying a second interference signal in the transmit signal path, based on a second compensation control signal; and a feedback receiver unit configured to generate the first compensation control signal based on the residual interference signal and the first cancellation signal, and configured to generate the second compensation control signal based on the residual interference signal and the second cancellation signal.

Example 11 is an apparatus including the subject matter of example 10, wherein the first interference signal comprises a Tx signal at a Rx frequency and the second interference signal comprises a Tx signal at Tx frequency.

Example 12 is an apparatus including the subject matter of examples 10-11, including or omitting elements, further comprising a first coupling unit coupled to the transmit signal path, configured to sample the overall Tx signal in the transmit signal path and generate a first overall Tx signal comprising the first interference signal at a first output of the first coupling unit and a second overall Tx signal comprising the second interference signal at a second output of the first coupling unit.

Example 13 is an apparatus including the subject matter of examples 10-12, including or omitting elements, further comprising a second coupling unit coupled to an output of the first compensation unit, configured to sample the first cancellation signal and generate a first coupled signal at a first output of the second coupling unit and a second coupled signal at a second output of the second coupling unit, wherein the first coupled signal and the second coupled signal are each based on the first cancellation signal.

Example 14 is an apparatus including the subject matter of examples 10-13, including or omitting elements, wherein the cancellation unit comprises a third coupling unit configured to receive the overall Rx signal and sample the residual interference signal in the overall Rx signal to generate a residual Tx output signal at a first output of the third coupling unit, and configured to receive the first coupled signal from the first output of the second coupling unit and cancel the first coupled signal from the overall Rx signal at a second output of the third coupling unit.

Example 15 is an apparatus including the subject matter of examples 10-14, including or omitting elements, further comprising a fourth coupling unit coupled to an output of the second compensation unit, configured to sample the second cancellation signal and generate a third coupled signal at a first output of the fourth coupling unit and a fourth coupled signal at a second output of the fourth coupling unit, and configured to provide the third coupled signal to the second output of the third coupling unit and generate a cancellation of the third coupled signal from the overall Rx signal at the second output of the third coupling unit, wherein the third coupled signal and the fourth coupled signal are based on the second cancellation signal.

Example 16 is an apparatus including the subject matter of examples 10-15, including or omitting elements, wherein the first compensation unit further comprises a first attenuation unit or a first phase shift unit configured to modify the Tx signal at Rx frequency in the first overall Tx signal by applying a first attenuation or a first phase shift or, to generate the first cancellation signal, prior to sampling the first cancellation signal at the second coupling unit.

Example 17 is an apparatus including the subject matter of examples 10-16, including or omitting elements, wherein the second compensation unit further comprises an second attenuation unit or a second phase shift unit configured to modify the Tx signal at Tx frequency in the second overall Tx signal by applying a second attenuation or a second phase shift, to generate the second cancellation signal, prior to sampling the second cancellation signal at the fourth coupling unit.

Example 18 is an apparatus including the subject matter of examples 10-17, including or omitting elements, wherein the feedback receiver unit is configured to receive the residual Tx output signal from the first output of the third coupling unit, the second coupled signal from the second output of the second coupling unit and the fourth coupled signal from the second output of the fourth coupling unit, and generate the first compensation control signal for compensating the Tx signal at Rx frequency in the first overall Tx signal based on a comparison between the residual Tx output signal and the second coupled signal, and generate the second compensation control signal for compensating the Tx signal at Tx frequency in the second overall Tx signal based on a comparison between the residual Tx output signal and the fourth coupled signal.

Example 19 is an apparatus including the subject matter of examples 10-18, including or omitting elements, wherein the first coupling unit comprises a directional coupler comprising an input configured to receive the overall Tx signal in the transmit signal path, a first output configured to provide the first overall Tx signal to the second coupling unit, and a second output configured to provide the second overall Tx signal to the fourth coupling unit, wherein the directional coupler is configured to sample the overall Tx signal to generate the first overall Tx signal and the second overall Tx signal.

Example 20 is an apparatus including the subject matter of examples 10-19, including or omitting elements, wherein the second coupling unit comprises a directional coupler comprising an input configured to receive the first cancellation signal, a first output configured to provide the first coupled signal to the third coupling unit and a second output configured to provide the second coupled signal to the feedback receiver unit, wherein the directional coupler is configured to sample the first cancellation signal and generate the first coupled signal and the second coupled signal based thereon.

Example 21 is an apparatus including the subject matter of examples 10-20, including or omitting elements, wherein the third coupling unit comprises a bi-directional coupler comprising a first input configured to receive the overall Rx signal in the receive signal path, a second input configured to receive the first coupled signal from the second coupling unit, a first output configured to provide the residual Tx output signal to the feedback receiver unit and a second output configured to provide a Rx signal with reduced interference to the Rx input port of a transceiver, wherein the bi-directional coupler is configured to sample the residual Tx signal from the overall Rx signal to generate the residual Tx output signal, and cancel the first coupled signal from the overall Rx signal to generate the Rx signal with reduced interference.

Example 22 is an apparatus including the subject matter of examples 10-21, including or omitting elements, wherein the fourth coupling unit comprises a directional coupler comprising an input configured to receive the second cancellation signal, a first output configured to provide the third coupled signal to the second output of the third coupling unit and a second output configured to provide the fourth coupled signal to the feedback receiver unit, wherein the directional coupler is configured to sample the second cancellation signal and generate the first coupled signal and the second coupled signal based thereon.

Example 23 is a method for a wireless communication system with a diversity antenna configured for reception, that has at least one receive signal path configured to convey an overall receive (Rx) signal comprising an Rx signal and a residual transmit (Tx) signal from a diversity antenna port to an Rx input port of a transceiver and one cancellation path configured to receive a leakage Tx signal from the diversity antenna port, comprising; sampling a compensated leakage Tx signal in the cancellation path at a first coupling unit and generating a first leakage Tx output signal and a second leakage Tx output signal based on the compensated leakage Tx signal; sampling the residual Tx signal in the overall Rx signal at a second coupling unit to generate a residual Tx output signal at a first output of the second coupling unit; receiving the first leakage Tx output signal from the first coupling unit at the second coupling unit and generating a cancellation of the residual Tx signal in the receive signal path at a second output of the second coupling unit; and providing the second leakage Tx output signal from the first coupling unit and the residual Tx output signal from the second coupling unit to a feedback receiver and generating a compensation control signal for compensating the leakage Tx signal in the cancellation path based thereon, to form the compensated leakage Tx signal.

Example 24 is a method including the subject matter of example 23, including or omitting elements, wherein generating the compensation control signal comprises determining, at the feedback receiver, an attenuation or a phase shift to be applied to the leakage Tx signal in the cancellation path based on a comparison between the residual Tx output signal and the second leakage Tx output signal.

Example 25 is a method for a wireless communication system with a main antenna, that has at least one receive signal path configured to convey an overall receive (Rx) signal comprising an Rx signal and residual interference signal comprising a first residual interference signal and a second residual interference signal from a main antenna port to an Rx input port of a transceiver and at least one transmit signal path configured to convey an overall Tx signal, from an output port of a power amplifier to the main antenna port, comprising; sampling the overall Tx signal in the transmit signal path at a first coupling unit to provide a first interference signal and a second interference signal; sampling a compensated first interference signal associated with the first interference signal at a second coupling unit and generating a first coupled signal and a second coupled signal based thereon; sampling the residual interference signal in the overall Rx signal at a third coupling unit to provide a residual output interference signal based on the residual interference signal at a first output of the third coupling unit; receiving the first coupled signal from the second coupling unit at the third coupling unit and generating a cancellation of the first residual interference signal in the receive signal path at a second output of the third coupling unit; sampling a compensated second interference signal associated with the second interference signal at a fourth coupling unit and generating a third coupled signal and a fourth coupled signal based thereon; providing the third coupled signal to the second output of the third coupling unit and generating a cancellation of the second residual interference signal in the receive signal path at the second output of the third coupling unit; and providing the residual output interference signal from the third coupling unit, the second coupled signal from the second coupling unit and the fourth coupled signal from the fourth coupling unit to a feedback receiver unit and generating a first compensation control signal for compensating the first interference signal based on a comparison of the residual output interference signal and the second coupled signal to iteratively arrive at a final value of the compensated first interference signal, and generating a second compensation control signal for compensating the second interference signal based on a comparison of the residual output interference signal and the fourth coupled signal to iteratively arrive at a final value of the compensated second interference signal.

Example 26 is a method including the subject matter of example 25, including or omitting elements, wherein the first interference signal comprises a Tx signal at Rx frequency, and the second interference signal comprises a Tx signal at Tx frequency.

Example 27 is a method including the subject matter of examples 25-26, including or omitting elements, wherein generating the first compensation control signal comprises determining, at the feedback receiver, a first attenuation or a first phase shift to be applied to the Tx signal at the Rx frequency in the first interference signal based on a comparison between the residual output interference signal and the second coupled signal, and generating the second compensation control signal comprises determining at the feedback receiver, a second attenuation or a second phase shift to be applied to the Tx signal at the Tx frequency in the second interference signal based on a comparison between the residual output interference signal and the fourth coupled signal.

Example 28 is an apparatus including the subject matter of example 10, wherein the first interference signal comprises a blocker signal and the second interference signal comprises a Tx signal at Tx frequency.

Example 29 is a method including the subject matter of example 25, including or omitting elements, wherein the first interference signal comprises a blocker signal, and the second interference signal comprises a Tx signal at Tx frequency.

Example 30 is an apparatus including the subject matter of example 1, wherein the overall Rx signal further comprises a residual blocker signal and wherein the cancellation unit is further configured to apply a second cancellation signal to the overall Rx signal in the receive signal path.

Example 31 is an apparatus including the subject matter of examples 1 and 30, including or omitting elements, further comprising a second cancellation path configured to receive a leakage blocker signal from the antenna port; and a second compensation unit configured to generate the second cancellation signal by modifying the leakage blocker signal in the second cancellation path, based on a second compensation control signal.

Example 32 is an apparatus including the subject matter of examples 1, 30 and 31, including or omitting elements, wherein the feedback receiver unit is further configured to generate the second compensation control signal based on the residual blocker signal and the second cancellation signal.

Example 33 is a method including the subject matter of example 23, including or omitting elements, wherein the overall Rx signal further comprises a residual blocker signal and the wireless communication system further comprises a second cancellation path configured to receive a leakage blocker signal from the diversity antenna port.

Example 34 is a method including the subject matter of examples 23 and 33, including or omitting elements, further comprising: sampling a compensated leakage blocker signal in the second cancellation path at a third coupling unit and generating a first leakage blocker output signal and a second leakage blocker output signal based on the compensated leakage blocker signal; sampling the residual blocker signal in the overall Rx signal at the second coupling unit to generate a residual blocker output signal at the first output of the second coupling unit; receiving the first leakage blocker output signal from the third coupling unit at the second coupling unit and generating a cancellation of the residual blocker signal in the receive signal path at the second output of the second coupling unit; and providing the second leakage blocker output signal from the third coupling unit and the residual blocker output signal from the second coupling unit to the feedback receiver and generating a second compensation control signal for compensating the leakage blocker signal in the second cancellation path based thereon, to form the compensated leakage blocker signal.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

The invention claimed is:

1. An apparatus for interference cancellation in a wireless communication system with a diversity antenna configured for reception, comprising:
   a receive signal path configured to transfer an overall receive (Rx) signal comprising an Rx signal and a residual transmit (Tx) signal, from an antenna port to an Rx input port of a transceiver;
   at least one cancellation path configured to receive a leakage Tx signal from the antenna port;
   a cancellation unit configured to apply a cancellation signal, to the overall Rx signal in the receive signal path;
   a compensation unit configured to generate the cancellation signal by modifying the leakage Tx signal in the cancellation path, based on a compensation control signal; and
   a feedback receiver unit configured to generate the compensation control signal based on the residual Tx signal and the cancellation signal.

2. The apparatus of claim 1, further comprising a first coupling unit coupled to an output of the compensation unit, configured to:
   sample the cancellation signal, and generate a first leakage Tx output signal at a first output of the first coupling unit and a second leakage Tx output signal at a second output of the first coupling unit,
   wherein the first leakage Tx output signal and the second leakage Tx output signal are based on the cancellation signal.

3. The apparatus of claim 2, wherein the compensation unit further comprise:
   an attenuation unit or phase shift unit, configured to modify the leakage Tx signal by applying an attenuation or a phase shift, to generate the cancellation signal, prior to sampling the cancellation signal in the first coupling unit.

4. The apparatus of claim 3, wherein the compensation control signal comprises the attenuation or the phase shift, to be applied to the leakage Tx signal in the cancellation path, and
   wherein the feedback receiver is configured to enable a closed loop cancellation of the residual Tx signal in the receive signal path by selectively applying the attenuation and the phase shift to the leakage Tx signal in the cancellation path based on a predetermined threshold.

5. The apparatus of claim 2, wherein the cancellation unit comprises a second coupling unit configured to:
   receive the overall Rx signal and sample the residual Tx signal from the overall Rx signal to generate a residual Tx output signal at a first output of the second coupling unit, and
   receive the first leakage Tx output signal from the first output of the first coupling unit and cancel the first leakage Tx output signal from the overall Rx signal at a second output of the second coupling unit.

6. The apparatus of claim 5, wherein the feedback receiver unit is configured to: receive the residual Tx output signal from the first output of the second coupling unit and the second leakage Tx output signal from the second output of the first coupling unit, and
   generate the compensation control signal for compensating the leakage Tx signal in the cancellation path based on the residual Tx output signal and the second leakage Tx output signal.

7. The apparatus of claim 5, wherein the first coupling unit comprises:
   a directional coupler comprising an input configured to receive the cancellation signal, a first output configured to generate the first leakage Tx output signal to the second coupling unit and a second output configured to provide the second leakage Tx output signal to the feedback receiver,
   wherein the directional coupler is configured to sample the cancellation signal to generate the first leakage Tx output signal and the second leakage Tx output signal.

8. The apparatus of claim 5, wherein the second coupling unit comprises:
   a bi-directional coupler comprising a first input configured to receive the overall Rx signal in the receive signal path, a second input configured to receive the first leakage Tx output signal from the first coupling unit, a first output configured to generate the residual Tx output signal to the feedback receiver and a second output configured to generate a Rx signal with reduced interference to the Rx input port of a transceiver,
   wherein the bi-directional coupler is configured to sample the residual Tx signal from the overall Rx signal to generate the residual Tx output signal, and cancel the first leakage Tx output signal from the overall Rx signal to generate the Rx signal with reduced interference.

9. The apparatus of claim 5, further comprising an Rx filter coupled between the antenna port and the second coupling unit in the receive signal path configured to filter out the leakage Tx signal from the Rx signal, and a Tx filter coupled between the antenna port and the compensation unit in the cancellation path configured to filter out the Rx signal from the leakage Tx signal.

10. An apparatus for interference cancellation in a wireless communication system with a main antenna, comprising:
   a receive signal path configured to transfer an overall receive (Rx) signal comprising an Rx signal and a residual interference signal from an antenna port to an Rx input port of a transceiver;
   a transmit signal path configured to transfer an overall Tx signal, from an output port of a power amplifier to the antenna port;
   a cancellation unit configured to apply a first cancellation signal, and a second cancellation signal to the overall Rx signal in the receive signal path;
   a first compensation unit configured to generate the first cancellation signal by modifying a first interference signal in the transmit signal path, based on a first compensation control signal;
   a second compensation unit configured to generate the second cancellation signal by modifying a second interference signal in the transmit signal path, based on a second compensation control signal; and a feedback receiver unit configured to generate the first compensation control signal based on the residual interference signal and the first cancellation signal, and configured to generate the second compensation control signal based on the residual interference signal and the second cancellation signal.

11. The apparatus of claim 10, wherein the first interference signal comprises a Tx signal at a Rx frequency and the second interference signal comprises a Tx signal at Tx frequency.

12. The apparatus of claim 11, further comprising a first coupling unit coupled to the transmit signal path, configured to sample the overall Tx signal in the transmit signal path and generate a first overall Tx signal comprising the first interference signal at a first output of the first coupling unit and a second overall Tx signal comprising the second interference signal at a second output of the first coupling unit.

13. The apparatus of claim 12, further comprising a second coupling unit coupled to an output of the first compensation unit, configured to sample the first cancellation signal and generate a first coupled signal at a first output of the second coupling unit and a second coupled signal at a second output of the second coupling unit, wherein the first coupled signal and the second coupled signal are each based on the first cancellation signal.

14. The apparatus of claim 13, wherein the first compensation unit further comprises a first attenuation unit or a first phase shift unit configured to modify the Tx signal at Rx frequency in the first overall Tx signal by applying a first attenuation or a first phase shift or, to generate the first cancellation signal, prior to sampling the first cancellation signal at the second coupling unit.

15. The apparatus of claim 13, wherein the cancellation unit comprises a third coupling unit configured to receive the overall Rx signal and sample the residual interference signal in the overall Rx signal to generate a residual Tx output signal at a first output of the third coupling unit, and configured to receive the first coupled signal from the first output of the second coupling unit and cancel the first coupled signal from the overall Rx signal at a second output of the third coupling unit.

16. The apparatus of claim 15, wherein the second coupling unit comprises a directional coupler comprising an input configured to receive the first cancellation signal, a first output configured to provide the first coupled signal to the third coupling unit and a second output configured to provide the second coupled signal to the feedback receiver unit, wherein the directional coupler is configured to sample the first cancellation signal and generate the first coupled signal and the second coupled signal based thereon.

17. The apparatus of claim 15, wherein the third coupling unit comprises a bi-directional coupler comprising a first input configured to receive the overall Rx signal in the receive signal path, a second input configured to receive the first coupled signal from the second coupling unit, a first output configured to provide the residual Tx output signal to the feedback receiver unit and a second output configured to provide a Rx signal with reduced interference to the Rx input port of a transceiver, wherein the bi-directional coupler is configured to sample the residual Tx signal from the overall Rx signal to generate the residual Tx output signal, and cancel the first coupled signal from the overall Rx signal to generate the Rx signal with reduced interference.

18. The apparatus of claim 15, further comprising a fourth coupling unit coupled to an output of the second compensation unit, configured to sample the second cancellation signal and generate a third coupled signal at a first output of the fourth coupling unit and a fourth coupled signal at a second output of the fourth coupling unit, and configured to provide the third coupled signal to the second output of the third coupling unit and generate a cancellation of the third coupled signal from the overall Rx signal at the second output of the third coupling unit, wherein the third coupled signal and the fourth coupled signal are based on the second cancellation signal.

19. The apparatus of claim 18, wherein the second compensation unit further comprises an second attenuation unit or a second phase shift unit configured to modify the Tx signal at Tx frequency in the second overall Tx signal by applying a second attenuation or a second phase shift, to generate the second cancellation signal, prior to sampling the second cancellation signal at the fourth coupling unit.

20. The apparatus of claim 18, wherein the feedback receiver unit is configured to receive the residual Tx output signal from the first output of the third coupling unit, the second coupled signal from the second output of the second coupling unit and the fourth coupled signal from the second output of the fourth coupling unit, and generate the first compensation control signal for compensating the Tx signal at Rx frequency in the first overall Tx signal based on a comparison between the residual Tx output signal and the second coupled signal, and generate the second compensation control signal for compensating the Tx signal at Tx frequency in the second overall Tx signal based on a comparison between the residual Tx output signal and the fourth coupled signal.

21. The apparatus of claim 18, wherein the first coupling unit comprises a directional coupler comprising an input configured to receive the overall Tx signal in the transmit signal path, a first output configured to provide the first overall Tx signal to the second coupling unit, and a second output configured to provide the second overall Tx signal to the fourth coupling unit, wherein the directional coupler is configured to sample the overall Tx signal to generate the first overall Tx signal and the second overall Tx signal.

22. The apparatus of claim 18, wherein the fourth coupling unit comprises a directional coupler comprising an input configured to receive the second cancellation signal, a first output configured to provide the third coupled signal to the second output of the third coupling unit and a second output configured to provide the fourth coupled signal to the feedback receiver unit, wherein the directional coupler is configured to sample the second cancellation signal and generate the first coupled signal and the second coupled signal based thereon.

23. A method for a wireless communication system with a diversity antenna configured for reception, that has at least one receive signal path configured to convey an overall receive (Rx) signal comprising an Rx signal and a residual transmit (Tx) signal from a diversity antenna port to an Rx input port of a transceiver and one cancellation path configured to receive a leakage Tx signal from the diversity antenna port, comprising;
sampling a compensated leakage Tx signal in the cancellation path at a first coupling unit and generating a first leakage Tx output signal and a second leakage Tx output signal based on the compensated leakage Tx signal;
sampling the residual Tx signal in the overall Rx signal at a second coupling unit to generate a residual Tx output signal at a first output of the second coupling unit;
receiving the first leakage Tx output signal from the first coupling unit at the second coupling unit and generating a cancellation of the residual Tx signal in the receive signal path at a second output of the second coupling unit; and providing the second leakage Tx output signal from the first coupling unit and the residual Tx output signal from the second coupling unit to a feedback receiver and generating a compensation control signal for compensating the leakage Tx signal in the cancellation path based thereon, to form the compensated leakage Tx signal.

24. The method of claim 23, wherein generating the compensation control signal comprises determining, at the feedback receiver, an attenuation or a phase shift to be applied to the leakage Tx signal in the cancellation path based on a comparison between the residual Tx output signal and the second leakage Tx output signal.

25. A method for a wireless communication system with a main antenna, that has at least one receive signal path configured to convey an overall receive (Rx) signal comprising an Rx signal and residual interference signal comprising a first residual interference signal and a second residual interference signal from a main antenna port to an Rx input port of a transceiver and at least one transmit signal path configured to convey an overall Tx signal, from an output port of a power amplifier to the main antenna port, comprising;

sampling the overall Tx signal in the transmit signal path at a first coupling unit to provide a first interference signal and a second interference signal;

sampling a compensated first interference signal associated with the first interference signal at a second coupling unit and generating a first coupled signal and a second coupled signal based thereon;

sampling the residual interference signal in the overall Rx signal at a third coupling unit to provide a residual output interference signal based on the residual interference signal at a first output of the third coupling unit;

receiving the first coupled signal from the second coupling unit at the third coupling unit and generating a cancellation of the first residual interference signal in the receive signal path at a second output of the third coupling unit;

sampling a compensated second interference signal associated with the second interference signal at a fourth coupling unit and generating a third coupled signal and a fourth coupled signal based thereon;

providing the third coupled signal to the second output of the third coupling unit and generating a cancellation of the second residual interference signal in the receive signal path at the second output of the third coupling unit; and providing the residual output interference signal from the third coupling unit, the second coupled signal from the second coupling unit and the fourth coupled signal from the fourth coupling unit to a feedback receiver unit and generating a first compensation control signal for compensating the first interference signal based on a comparison of the residual output interference signal and the second coupled signal to iteratively arrive at a final value of the compensated first interference signal, and generating a second compensation control signal for compensating the second interference signal based on a comparison of the residual output interference signal and the fourth coupled signal to iteratively arrive at a final value of the compensated second interference signal.

26. The method of claim 25, wherein the first interference signal comprises a Tx signal at Rx frequency, and the second interference signal comprises a Tx signal at Tx frequency.

27. The method of claim 26, wherein generating the first compensation control signal comprises determining, at the feedback receiver, a first attenuation or a first phase shift to be applied to the Tx signal at the Rx frequency in the first interference signal based on a comparison between the residual output interference signal and the second coupled signal, and generating the second compensation control signal comprises determining at the feedback receiver, a second attenuation or a second phase shift to be applied to the Tx signal at the Tx frequency in the second interference signal based on a comparison between the residual output interference signal and the fourth coupled signal.

* * * * *